United States Patent
Naganuma et al.

(10) Patent No.: US 8,423,746 B2
(45) Date of Patent: Apr. 16, 2013

(54) STORAGE SYSTEM AND MANAGEMENT METHOD THEREOF

(75) Inventors: Yuki Naganuma, Yokohama (JP);
Hironori Emaru, Yokohama (JP);
Toshimichi Kishimoto, Hatano (JP);
Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/438,385

(22) Filed: Apr. 3, 2012

(65) Prior Publication Data

US 2012/0191941 A1    Jul. 26, 2012

Related U.S. Application Data

(63) Continuation of application No. 13/071,723, filed on Mar. 25, 2011, now Pat. No. 8,271,761, which is a continuation of application No. 12/109,439, filed on Apr. 25, 2008, now Pat. No. 8,151,080.

(30) Foreign Application Priority Data

Mar. 7, 2008  (JP) .................................. 2008-058402

(51) Int. Cl.
*G06F 12/00*    (2006.01)

(52) U.S. Cl.
USPC ............................ 711/173; 711/170; 711/172

(58) Field of Classification Search .................. 711/170, 711/172, 173
See application file for complete search history.

(56) References Cited

U.S. PATENT DOCUMENTS

| | | | |
|---|---|---|---|
| 6,895,429 | B2 | 5/2005 | Banga et al. |
| 7,360,034 | B1 | 4/2008 | Muhlestein et al. |
| 7,523,286 | B2 | 4/2009 | Ramany et al. |
| 2003/0172069 | A1 | 9/2003 | Uchiyama et al. |
| 2004/0078518 | A1 | 4/2004 | Kuwata |
| 2004/0123180 | A1 | 6/2004 | Soejima et al. |
| 2005/0228835 | A1 | 10/2005 | Roa |
| 2006/0031634 | A1 | 2/2006 | Nagai et al. |
| 2006/0095700 | A1 | 5/2006 | Sato et al. |
| 2006/0190693 | A1 | 8/2006 | Asano et al. |

FOREIGN PATENT DOCUMENTS

| | | |
|---|---|---|
| JP | 2003-330622 | 11/2003 |
| JP | 2004-139349 | 5/2004 |
| JP | 2004-246852 | 9/2004 |
| JP | 2006/235976 | 9/2006 |

OTHER PUBLICATIONS

Office Action in Japanese Patent Application 2008-058402, dispatched Mar. 6, 2012, (4 pgs.), [in Japanese].

*Primary Examiner* — Midys Rojas
(74) *Attorney, Agent, or Firm* — Antonelli, Terry, Stout & Kraus, LLP.

(57) ABSTRACT

A storage system having at least two storage apparatuses capable of partitioning an internal resource into logical partitions and managing the logical partitions, and which replicates data written into a primary volume of a primary storage apparatus as the replication source storage apparatus to a secondary volume of a secondary storage apparatus as the replication destination storage apparatus, including: a configuration information sending unit for sending configuration information of the logical partition, to which the primary volume belongs, to the secondary storage apparatus; and a logical partition setting unit for setting the configuration of the logical partition to which the secondary volume belongs based on the configuration information of the logical partition to which the primary volume belongs sent from the configuration information sending unit.

12 Claims, 30 Drawing Sheets

FIG.5

| VOLUME ID | CAPACITY | ATTRIBUTE | DISK TYPE | ACCESS COMPUTER ID |
|---|---|---|---|---|
| VOL1-1 | 64GB | Normal | FC | BCP1 |
| VOL1-2 | 32GB | Normal | FC | BCP1 |
| VOL1-3 | 64GB | Pool | FC | BCP1 |
| VOL1-4 | 128GB | Normal | FC | BCP1 |
| VOL1-5 | 32GB | Normal | SATA | BCP2 |
| 50A | 50B | 50C | 50D | 50E |

| VIRTUAL CACHE ID | CACHE MEMORY OCCUPANCY | ALLOCATED VOLUME ID |
|---|---|---|
| VCM1-1 | 40% | VOL1-1, VOL1-2, VOL1-3 |
| VCM1-2 | 20% | VOL1-4 |
| VCM1-3 | 30% | VOL1-5 |
| 51A | 51B | 51C |

| VIRTUAL STORAGE APPARATUS ID | ADMINISTRATOR ID | VIRTUAL CACHE ID | VOLUME ID |
|---|---|---|---|
| VST1-1 | AAA | VCM1-1 | VOL1-1, VOL1-2, VOL1-3 |
| | | VCM1-2 | VOL1-4 |
| VST1-2 | BBB | VCM1-3 | VOL1-5 |
| 52A | 52B | 52C | 52D |

REPLICATION PAIR INFORMATION TABLE

| PRIMARY VOLUME ID | SECONDARY VOLUME ID | PAIR STATUS | OTHER STORAGE APPARATUS ID | REPLICATION GROUP ID |
|---|---|---|---|---|
| VOL1-1 | VOL2-1 | copy | ST2 | CG1 |
| VOL1-2 | VOL2-2 | copy | ST2 | CG1 |
| 53A | 53B | 53C | 53D | 53E |

53

RESOURCE ALLOCATION CONVERSION TABLE

|  | RATIO TO CACHE OCCUPANCY (REPLICATION SOURCE) | |
|---|---|---|
|  | DURING NORMAL CONDITION | DURING TAKEOVER |
| CACHE OCCUPANCY (REPLICATION DESTINATION) | 50% | 100% |
|  | 54A | 54B |

REPLICATION PAIR DEFINITION COMMAND TABLE

| PRIMARY VOLUME | SECONDARY VOLUME | OTHER STORAGE APPARATUS ID | REPLICATION GROUP ID | VIRTUAL STORAGE ENVIRONMENT FLAG |
|---|---|---|---|---|
| VOL1-1 | VOL2-1 | ST2 | CG1 | 2 |
| VOL1-2 | VOL2-2 | ST2 | CG1 | 2 |
| 80A | 80B | 80C | 80D | 80E |

VIRTUAL STORAGE APPARATUS ATTRIBUTE TABLE

| VIRTUAL STORAGE APPARATUS ID | ADMINISTRATOR |
|---|---|
| VST1-1 | AAA |
| 81A | 81B |

VIRTUAL STORAGE APPARATUS CONFIGURATION TABLE

| VIRTUAL CACHE ID | CACHE MEMORY OCCUPANCY | | VOLUME ID | REPLICATION GROUP ID | CAPACITY | ATTRIBUTE | DISK TYPE | ACCESS COMPUTER ID |
| --- | --- | --- | --- | --- | --- | --- | --- | --- |
| | DURING NORMAL CONDITION | DURING TAKEOVER | | | | | | |
| VCM1-1 | 20% | 40% | VOL1-1 | CG1 | 64GB | Normal | FC | BPC1 |
| | 10% | 20% | VOL1-2 | CG1 | 32GB | Normal | FC | BPC1 |
| VCM1-2 | 10% | 20% | VOL1-3 | - | 64GB | Pool | FC | BPC1 |
| | | | VOL1-4 | - | 128GB | Normal | FC | BPC1 |
| 82A | 82BX | 82BY | 82D | 82E | 82F | 82G | 82H | 82I |
| | 82B | | | | | | | 82 |

FIG.17

| STATUS | OCCUPANCY OF VIRTUAL CACHE 1 | OCCUPANCY OF VIRTUAL CACHE 2 | UNUSED CACHE |
|---|---|---|---|
| DURING NORMAL CONDITION | 20% | 10% | 70% |
| DURING TAKEOVER | 40% | 20% | 40% |

FIG.22

TAKEOVER MANAGEMENT TABLE

| REPLICATION PAIR ID | APPLICATION SERVER ID |
|---|---|
| CPR1 | BCP2 |
| CPR2 | BCP2 |

STORAGE RESOURCE TABLE

| STORAGE APPARATUS ID | CACHE MEMORY ID | TOTAL CACHE CAPACITY | TOTAL VOLUME CAPACITY |
|---|---|---|---|
| ST1 | CM1 | 64GB | 100TB |
| ST2 | CM2 | 92GB | 200TB |
| ST3 | CM3 | 128GB | 300TB |

VOLUME INFORMATION MANAGEMENT TABLE

| VOLUME ID | STORAGE APPARATUS ID | CAPACITY | ATTRIBUTE | DISK TYPE | ACCESS COMPUTER ID |
|---|---|---|---|---|---|
| VOL1-1 | ST1 | 32GB | Normal | FC | BCP1, BCP2 |
| VOL1-2 | ST1 | 32GB | Normal | FC | BCP1, BCP2 |
| VOL2-1 | ST2 | 64GB | Normal | FC | BCP2 |
| VOL2-2 | ST2 | 128GB | Normal | FC | BCP2 |
| VOL3-1 | ST3 | 64GB | Normal | SATA | BCP2 |
| VOL3-2 | ST3 | 128GB | Normal | SATA | BCP2 |
| VOL3-3 | ST3 | 32GB | Normal | SATA | |
| VOL3-4 | ST3 | 32GB | Normal | SATA | |

REPLICATION PAIR INFORMATION TABLE

| REPLICATION PAIR ID | PRIMARY STORAGE APPARATUS ID | PRIMARY VOLUME ID | SECONDARY STORAGE APPARATUS ID | SECONDARY VOLUME ID | PAIR STATUS | REPLICATION GROUP ID |
|---|---|---|---|---|---|---|
| CPR1 | ST2 | VOL2-1 | ST3 | VOL3-1 | pair | - |
| CPR 2 | ST2 | VOL2-2 | ST3 | VOL3-2 | pair | - |

VIRTUAL STORAGE APPARATUS MANAGEMENT TABLE

| VIRTUAL STORAGE APPARATUS ID | STORAGE APPARATUS ID | ADMINISTRATOR | VIRTUAL CACHE ID | VOLUME ID |
|---|---|---|---|---|
| VST1-1 | ST1 | AAA1 | VCM1-1 | VOL1-1, VOL1-2, |
| VST2-1 | ST2 | BBB1 | VCM2-1 | VOL2-1 |
| VST2-2 | ST2 | BBB2 | VCM2-2 | VOL2-2 |
| VST3-1 | ST3 | CCC1 | VCMC3-1 | VOL3-1 |
| VST3-2 | ST3 | CCC2 | VCMC3-2 | VOL3-2 |
| 134A | 134B | 134C | 134D | 134E |

VIRTUAL CACHE MANAGEMENT TABLE

| VIRTUAL CACHE ID | STORAGE APPARATUS ID | CACHE MEMORY OCCUPANCY | VOLUME ID | STATUS |
|---|---|---|---|---|
| VCM1-1 | ST2 | 40GB | VOL1-1, VOL1-2 | active |
| VCM2-1 | ST2 | 40GB | VOL2-1 | active |
| VCM2-2 | ST2 | 45GB | VOL2-2 | active |
| VCMC3-1 | ST3 | 15GB | VOL3-1 | passive |
| VCMC3-2 | ST3 | 30GB | VOL3-2 | passive |
| 135A | 135B | 135C | 135D | 135E |

RESOURCE ALLOCATION MANAGEMENT TABLE

| VIRTUAL CACHE ID | STORAGE APPARATUS ID | CACHE MEMORY OCCUPANCY 136C | |
|---|---|---|---|
| | | passive | active |
| VCM1-1 | ST1 | 40GB | 40GB |
| VCM2-1 | ST2 | 40GB | 40GB |
| VCM2-2 | ST2 | 45GB | 45GB |
| VCMC3-1 | ST3 | 15GB | 40GB |
| VCMC3-2 | ST3 | 30GB | 45GB |
| 136A | 136B | 136CX | 136CY |

VIRTUAL ENVIRONMENT USAGE MANAGEMENT TABLE

| REPLICATION PAIR ID | VIRTUAL STORAGE USAGE FLAG |
|---|---|
| CPR1 | 1 |
| CPR2 | 1 |
| 137A | 137B |

|  | CACHE OCCUPANCY OF "VCM 3-1" | CACHE OCCUPANCY OF "VCM 3-2" | CACHE OCCUPANCY OF "VCM 3-3" | TOTAL OCCUPANCY |
|---|---|---|---|---|
| NORMAL CONDITION | 15 | 30 | 40 | 85 |
| FAILURE IN "VOL 2-1" | 30 | 30 | 40 | 100 |
| FAILURE IN "VOL 2-1" AND "VOL 2-2" | 30 | 45 | 40 | 115 |
| FAILURE IN "VOL 1-1," "VOL 2-1" AND "VOL 2-2" | 30 | 45 | 60 | 135 |

FIG.35

RESOURCE ALLOCATION MANAGEMENT TABLE

| VIRTUAL CACHE ID | STORAGE ID | CACHE PRIORITY |
|---|---|---|
| VCM1-1 | ST1 | - |
| VCM2-1 | ST2 | - |
| VCM2-2 | ST2 | - |
| VCM3-1 | ST3 | 3 |
| VCM3-2 | ST3 | 1 |
| VCM3-3 | ST3 | 6 |

| VIRTUAL CACHE ID | STORAGE ID | CACHE PRIORITY | CACHE MEMORY OCCUPANCY ||
|---|---|---|---|---|
| | | | passive | active |
| VCM1-1 | ST1 | - | 40GB | 40GB |
| VCM2-1 | ST2 | - | 40GB | 40GB |
| VCM2-2 | ST2 | - | 45GB | 45GB |
| VCM3-1 | ST3 | 1 | 15GB | 40GB |
| VCM3-2 | ST3 | 3 | 30GB | 45GB |
| VCM3-3 | ST3 | 6 | 50GB | 60GB |
| 203A | 203B | 203C | 203D | 203E |

203

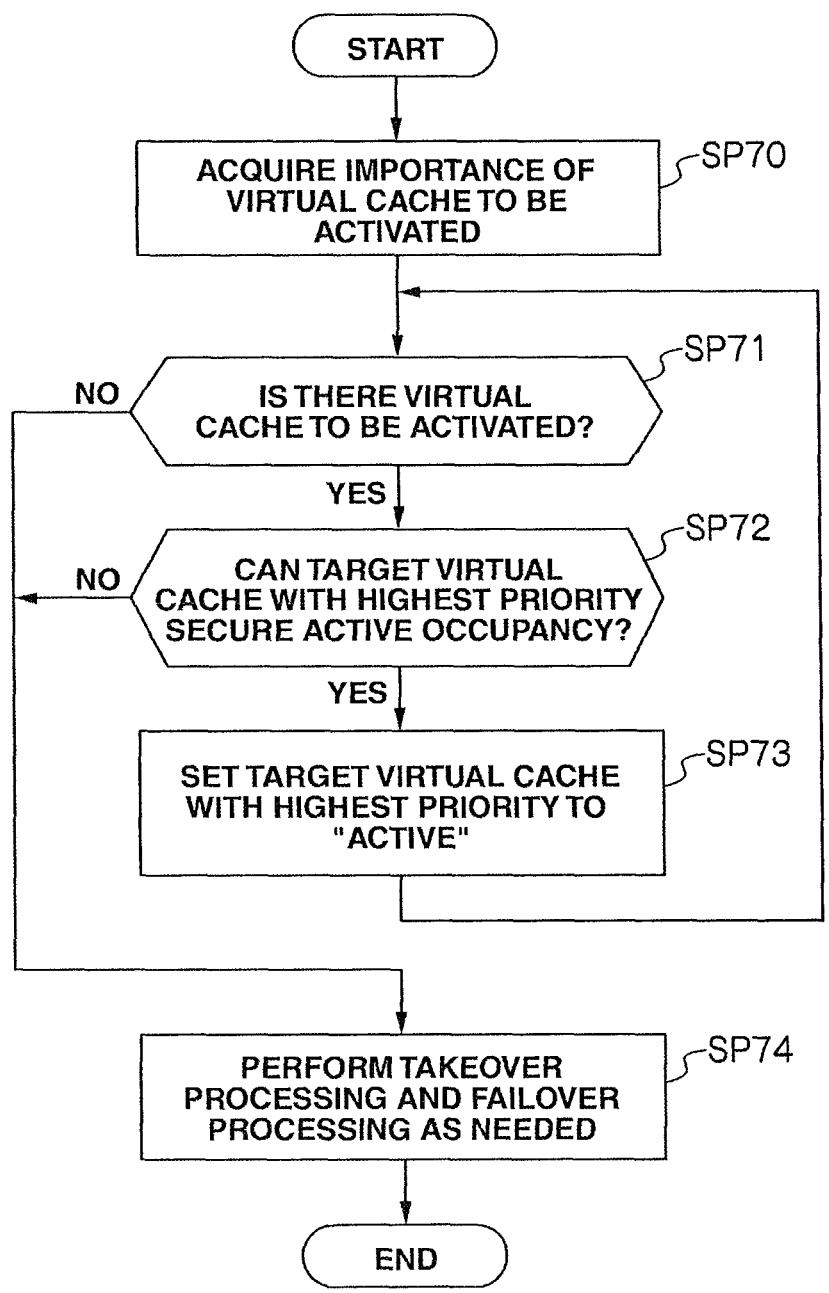

STORAGE SYSTEM AND MANAGEMENT METHOD THEREOF

CROSS REFERENCE TO RELATED APPLICATIONS

This is a continuation of U.S. application Ser. No. 13/071,723, filed Mar. 25, 2011 now U.S. Pat. No. 8,271,761, which, in turn is a continuation of U.S. application Ser. No. 12/109,439, filed Apr. 25, 2008 (now U.S. Pat. No. 8,151,080). This application relates to and claims priority from Japanese Patent Application No. 2008-058402, filed on Mar. 7, 2008. The entirety of the contents and subject matter of all of the above is incorporated herein by reference.

BACKGROUND

The present invention generally relates to a storage system and its management method and, for instance, can be suitably applied to a storage system comprising at least two storage apparatuses equipped with a virtual storage function and a remote replication function.

In recent years, storage consolidation of consolidating storage apparatuses that are distributed and installed for each server at a single location, and connecting this to a server group via a storage-dedicated network such as a SAN (Storage Area Network) is becoming widespread. As one operation mode of storage consolidation, there is an operation mode of sharing one storage in a plurality of business operations. In relation to this kind of operation mode, virtual storage technology has been conventionally proposed for partitioning resources (internal resources) such as ports, cache memories and volumes in the storage apparatus into a plurality of logical partitions, and providing each logical partition as an independent virtual storage apparatus (hereinafter referred to as the "virtual storage apparatus") to users (refer to Japanese Patent Laid-Open Publication No. 2003-330622).

Meanwhile, there is technology for facilitating the setting for preventing operational errors by changing the user's authority to operate a volume, with the application of volume attributes as the trigger, when a plurality of users are allowed to operate that volume in a storage system (refer to Japanese Patent Laid-Open Publication No. 2006-235976). According to this technology, if a certain user creates a replication of a volume that can be operated by a plurality of users, each user's operation authority can be automatically changed so that users other than the user who created the replication cannot perform operations to the replication of the volume.

SUMMARY

Meanwhile, when performing remote replication of a volume for the purpose of disaster recovery in a storage system adopting the virtual storage technology, in order to enable the use of a replication destination storage apparatus (hereinafter referred to as the "secondary storage apparatus") in a virtual storage apparatus environment corresponding to a replication source storage apparatus (hereinafter referred to as the "primary storage apparatus") after the disaster recovery, it is necessary to set a virtual storage apparatus, which corresponds to the corresponding virtual storage apparatus set in the primary storage apparatus, in the secondary storage apparatus.

In the foregoing case, the setting of the virtual storage apparatus environment in the secondary storage apparatus will not be much of a problem if only a few virtual storage apparatuses are set in the primary storage apparatus. If, however, numerous virtual storage apparatuses are set in the primary storage apparatus, the setting of virtual storage apparatuses corresponding to each of these virtual storage apparatuses in the secondary storage apparatus will be a cumbersome task and require much labor and time.

Further, in normal remote replication, differential data showing the difference in comparison to a replication source volume (hereinafter referred to as the "primary volume") sent from the primary storage apparatus is merely applied to a replication destination volume (hereinafter referred to as the "secondary volume") in the secondary storage apparatus. Thus, in comparison to the primary storage apparatus that needs to respond to the data I/O request from the application server, generally speaking, the secondary storage apparatus does not require the same level of capacity in the cache memory.

Nevertheless, when the virtual storage apparatus environment of the virtual storage apparatus set in the primary storage apparatus is set in the secondary storage apparatus as is, the same capacity as the cache memory capacity allocated to the virtual storage apparatus set in the primary storage apparatus will also be set in the virtual storage apparatus of the secondary storage apparatus, and, therefore, there is a problem in that the cache memory is wasted.

The present invention was devised in view of the foregoing points. Thus, an object of the present invention is to provide a storage system and its management method capable of setting, in a secondary storage apparatus, a virtual storage apparatus environment corresponding to a virtual storage apparatus in a primary storage apparatus with ease and in a short amount of time.

In order to achieve the foregoing object, the present invention provides a storage system having at least two storage apparatuses capable of partitioning an internal resource into logical partitions and managing the logical partitions, and which replicates data written into a primary volume of a primary storage apparatus as the replication source storage apparatus to a secondary volume of a secondary storage apparatus as the replication destination storage apparatus. This storage system comprises a configuration information sending unit for sending configuration information of the logical partition, to which the primary volume belongs, to the secondary storage apparatus, and a logical partition setting unit for setting the configuration of the logical partition to which the secondary volume belongs based on the configuration information of the logical partition to which the primary volume belongs sent from the configuration information sending unit.

Thereby, with this storage system, the logical partition is set in the secondary storage apparatus based on the configuration information of the logical partition to which the primary volume belongs without having to trouble the user.

The present invention additionally provides a management method of a storage system having at least two storage apparatuses capable of partitioning an internal resource into logical partitions and managing the logical partitions, and which replicates data written into a primary volume of a primary storage apparatus as the replication source storage apparatus to a secondary volume of a secondary storage apparatus as the replication destination storage apparatus. This management method comprises a first step for sending configuration information of the logical partition, to which the primary volume belongs, to the secondary storage apparatus, and a second step unit for setting the configuration of the logical partition to which the secondary volume belongs based on the configuration information of the logical partition to which the primary volume belongs.

Thereby, with this storage system management method, the logical partition can be set in the secondary storage apparatus based on the configuration information of the logical partition to which the primary volume belongs without having to trouble the user.

According to the present invention, the virtual storage apparatus environment corresponding to the virtual storage apparatus in the primary storage apparatus can be set in the secondary storage apparatus with ease and in a short amount of time.

DESCRIPTION OF DRAWINGS

FIG. 5 is a chart showing the configuration of a volume management table;

FIG. 6 is a chart showing the configuration of a cache management table;

FIG. 7 is a chart showing the configuration of a virtual storage apparatus management table;

FIG. 8 is a chart showing the configuration of a replication pair information table;

FIG. 13 is a chart showing the configuration of a replication pair configuration command table;

FIG. 14 is a chart showing the configuration of a virtual storage apparatus attribute table;

FIG. 15 is a chart showing the configuration of a virtual storage apparatus configuration table;

FIG. 17 is a chart showing an example of changes in the cache occupancy of a secondary storage;

FIG. 22 is a chart showing the configuration of a takeover management table;

FIG. 23 is a chart showing the configuration of a storage resource table;

FIG. 24 is a chart showing the configuration of a volume information management table;

FIG. 25 is a chart showing the configuration of a pair information management table;

FIG. 26 is a chart showing the configuration of a virtual storage apparatus management table;

FIG. 27 is a chart showing the configuration of a virtual cache management table;

FIG. 28 is a chart showing the configuration of a resource allocation management table according to the second embodiment;

FIG. 29 is a chart showing the configuration of a virtual environment usage management table;

FIG. 33 is a chart showing an example of changes in the status of the secondary storage apparatus;

FIG. 35 is a chart showing the configuration of a resource allocation management table according to the third embodiment;

FIG. 37 is a chart showing the configuration of a resource allocation management table according to the fourth embodiment; and FIG. 38 is a flowchart showing the processing routine of the takeover processing according to the fourth embodiment.

DETAILED DESCRIPTION

An embodiment of the present invention is now explained in detail with reference to the attached drawings.

Figure 1:
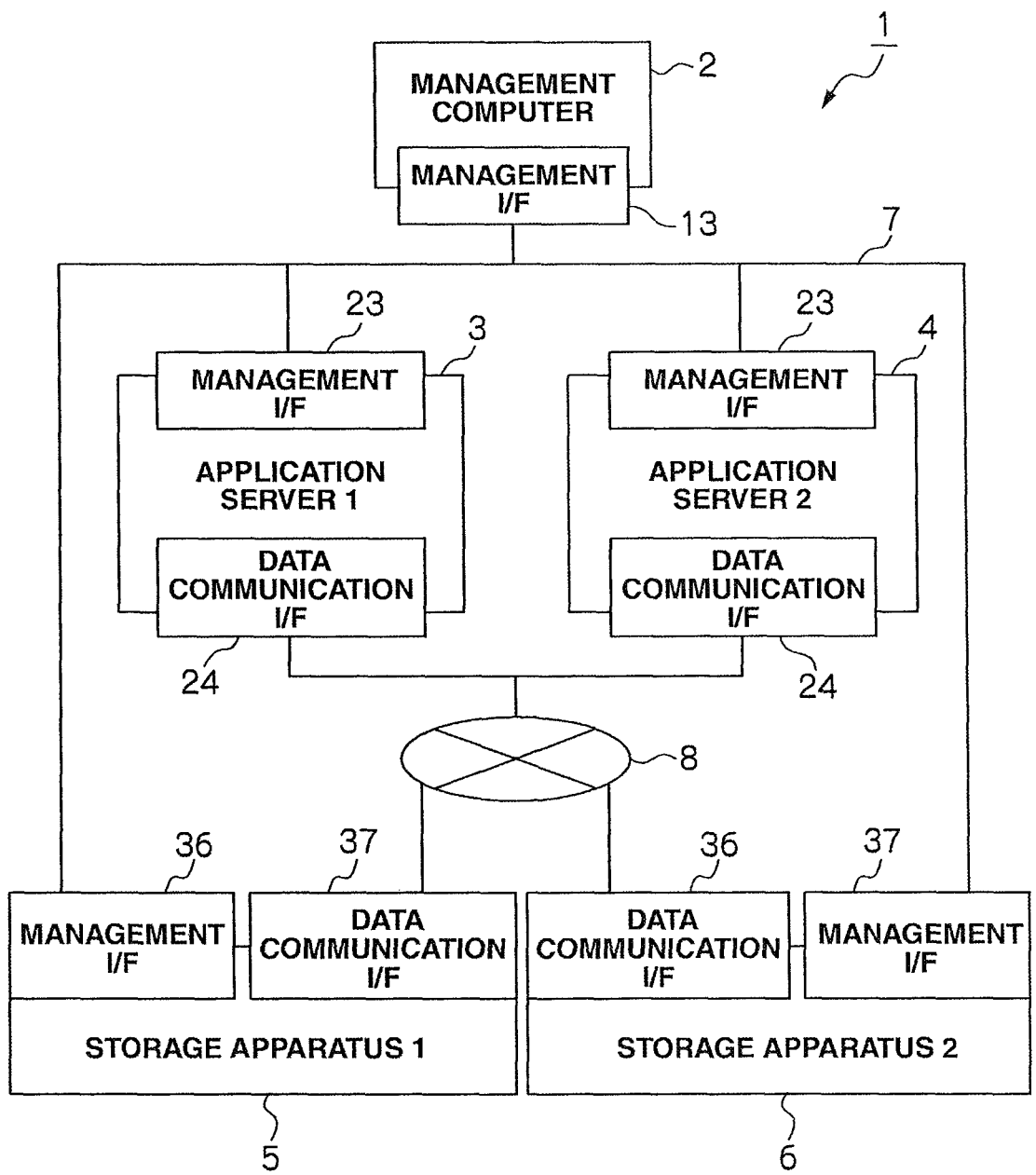
FIG. 1 is a block diagram showing the overall configuration of a storage system according to the first embodiment.
Figure 2:
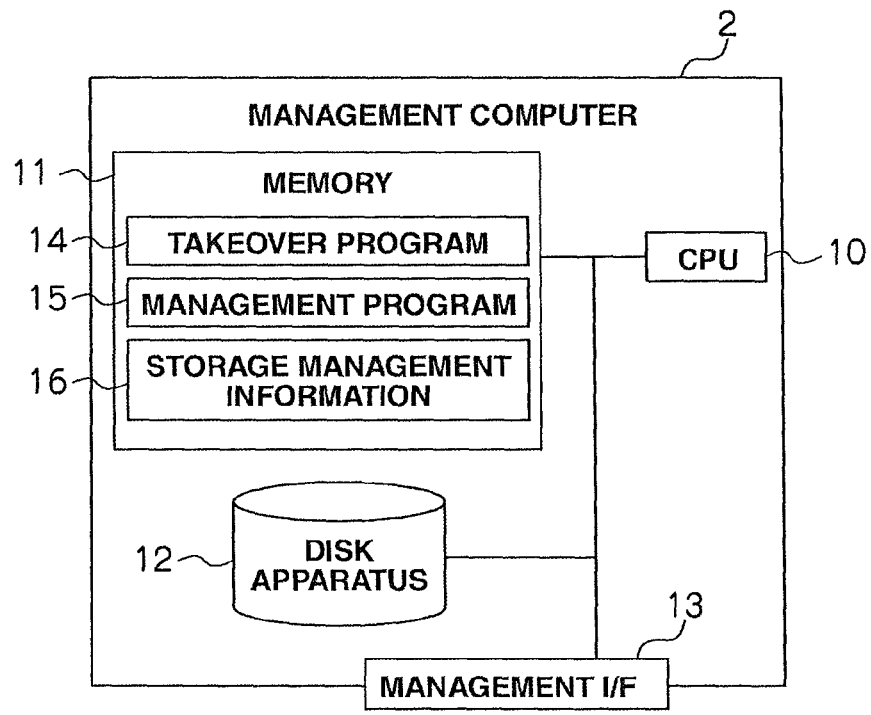
FIG. 2 is a block diagram showing the internal configuration of a management computer according to the first embodiment.

(1) First Embodiment (1-1) Configuration of Storage System According to First Embodiment FIG. 1 shows the overall storage system 1 according to this embodiment. The storage system is configured by a management computer 2, first and second application servers 3, 4, and first and second storage apparatuses 5, 6 being connected via a management network 7 such as a LAN (Local Area Network), and the first and second application servers 3, 4 and the first and second storage apparatuses 5, 6 being connected via a data communication network 8 such as a SAN (Storage Area Network). Although FIG. 1 illustrates an example where there are two application servers and two storage apparatuses for the sake of explanation, the number of application servers and storage apparatuses may be other than two. The management computer 2, as shown in FIG. 2, is a computer device comprising information processing resources such as a CPU (Central Processing Unit) 10, a memory 11 and a hard disk apparatus 12, and configured from a personal computer, a workstation, a mainframe or the like. The management computer 2 comprises an information input device (not shown) such as a keyboard, a switch, a pointing device, a microphone or the like, and an information output device (not shown) such as a microphone or the like. The management computer 2 is also provided with a management interface 13 for accessing the first and second application servers 3, 4 and the first and second storage apparatuses 5, 6 via the management network 7 (FIG. 1). If the management network 7 is a LAN, a LAN card is used as the management interface 13.

The memory 11 of the management computer 2 stores a takeover program 14, a management program 15, and storage management information 16. The takeover program 14 is a program for requesting the first and second application servers 3, 4 to boot the takeover cooperative program 25 upon receiving a notice from the storage apparatuses 5, 6 when a failure occurs in a volume of either the first or second storage apparatus 5, 6 (below, let it be assumed that a failure occurred in the first storage apparatus 5) which is being used by the first and second application servers 3, 4 for the reading and writing of data, and the replication of such volume exists in the other second storage apparatus 6.

In the ensuing explanation, the term "takeover" shall mean, in a case where a failure occurs in a volume of the first storage apparatus 5 being used by the first and second application servers 3, 4 for the reading and writing of data, the act of changing the access destination of the first and second application servers 3, 4 to the replication of such volume existing in the second storage apparatus 6.

The management program 15 is a program for the management computer 2 to manage the first and second application servers 3, 4 and the first and second storage apparatuses 5, 6 via the management network 7. The management computer 2, based on the management program 15, monitors the occurrence of a failure in the first and second application servers 3, 4 and performs processing for creating volumes in and configuring a replication pair based on remote replication between the first and second storage apparatuses 5, 6.

The storage management information 16 is configured from various types of information concerning the volumes in the first and second storage apparatuses 5, 6 managed by the management program 14, and various types of information concerning the remote replication between the first and second storage apparatuses 5, 6.

Figure 3:
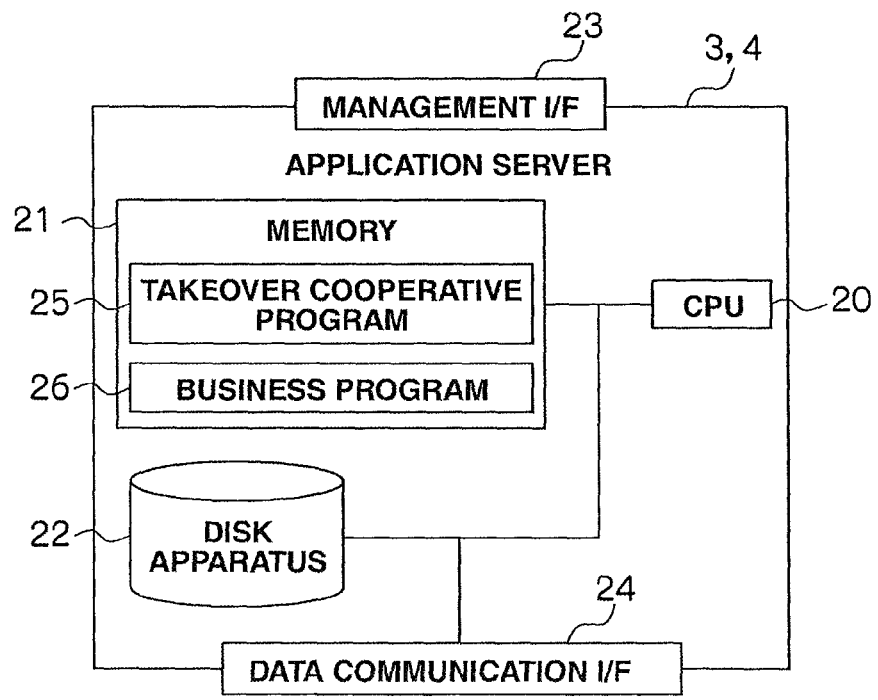
FIG. 3 is a block diagram showing the internal configuration of the first and second application servers according to the first embodiment.

The first and second application servers 3, 4, as shown in FIG. 3, are computer devices comprising information processing resources such as a CPU 20, a memory 21, and a hard disk apparatus 22, and configured from a personal computer, a workstation, a mainframe or the like. The first and second application servers 3, 4 are provided with a management interface 23 for accessing the management computer 2 and the first and second storage apparatuses 5, 6 via the management network 7, and a data communication interface 24 for accessing the first and second storage apparatuses 5, 6 via the data communication network 8. If the data communication network 8 is a SAN, an HBA (Host Bus Adapter) is used as the data communication interface 24.

The memory 21 of the first and second application servers 3, 4 stores a takeover cooperative program 25, and a business program 26 such as a database program. The takeover cooperative program 25 is a program for changing the setting of the first or second application server 3, 4 to switch from the volume in the first storage apparatus 5 to a designated volume in the second storage apparatus 6 when a notice for executing the takeover processing is issued from the management computer 2 as described above. The contents of the business program 25 in the first and second application servers 3, 4 may differ.

Figure 4:
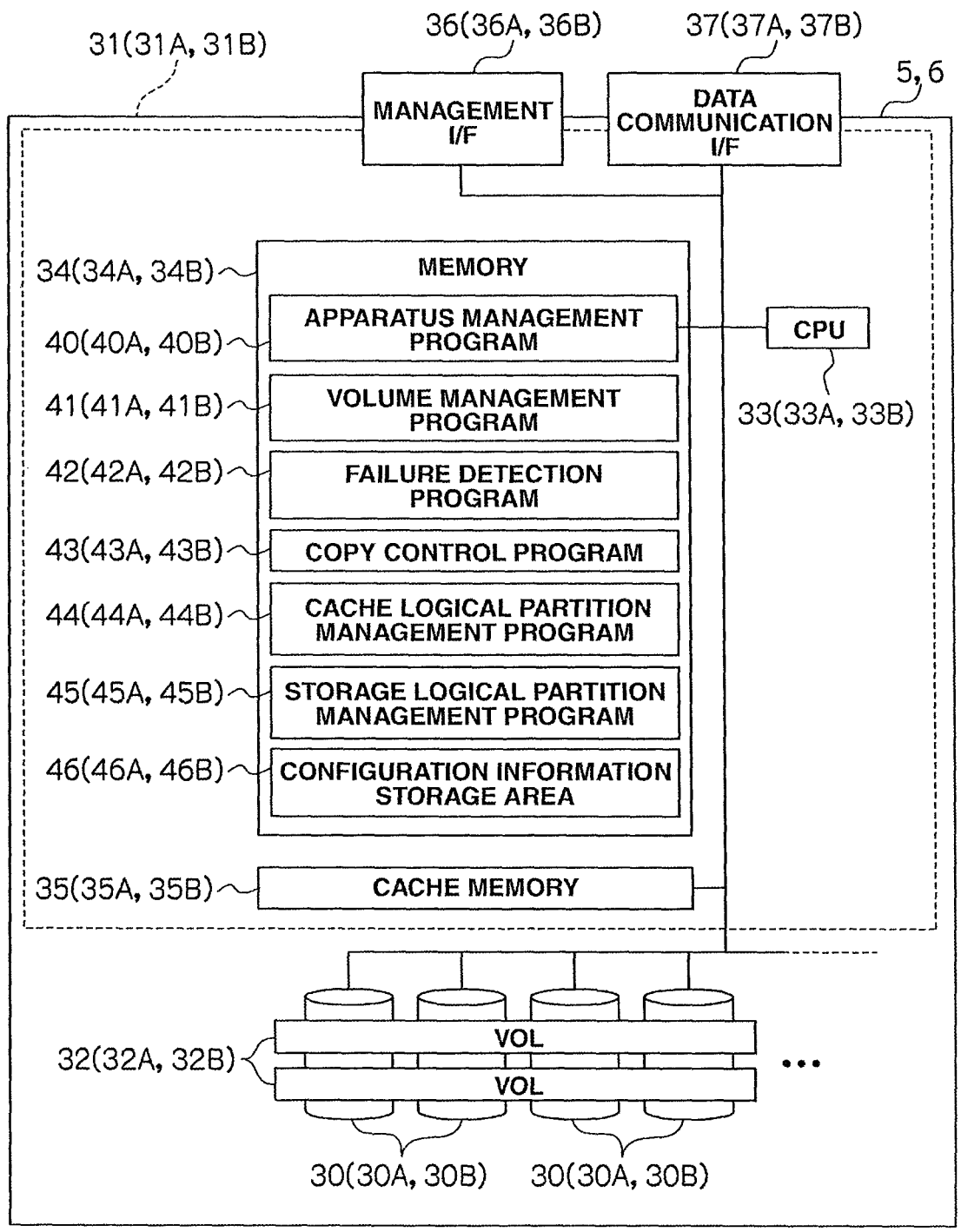
FIG. 4 is a block diagram showing the internal configuration of the first and second storage apparatuses.

The first and second storage apparatuses 5, 6, as shown in FIG. 4, is configured from a plurality of physical storage devices 30, and a control unit 31. As the physical storage devices 30, for instance, expensive disks such as FC (Fibre Channel) disks or inexpensive disks such as SATA (Serial AT Attachment) disks or optical disks are used. The physical storage disks 30 are operated by the control unit 31 according to the RAID configuration. One or more volumes 32 are set in a physical storage area provided by one or more physical storage disks 30. Data is stored in block (hereinafter referred to as the "logical block") units of a prescribed size in the volume 32.

The control unit 31 comprises a CPU 33, a memory 34, a cache memory 35, a management interface 36, and a data communication interface 37. The CPU 33 is a processor for governing the operational control of the overall first or second storage apparatus 5, 6, and executes the various types of processing described later by executing the various programs stored in the memory 34. The cache memory 35 is used for temporarily storing the data to be read from and written into the volume 32.

The memory 34 stores an apparatus management program 40, a volume management program 41, a failure detection program 42, a replication control program 43, a cache logical partition management program 44, and a storage logical partition management program 45.

The apparatus management program 40 is a program for performing processing such as calling the corresponding program upon receiving a command from the management program 15 (FIG. 2) of the management computer 2, and the volume management program 41 is a program for managing the volumes 32 in the self storage apparatus.

The failure detection program 42 is a program for monitoring the volumes 32 in the self storage apparatus and notifying the apparatus management program 40 upon detecting a failure. The apparatus management program 40 that received this notice notifies the content of the failure detected by the failure detection program 42 to the management program 15 of the management computer 2.

The replication control program 43 is a program for performing various types of control concerning remote replication, and the cache logical partition management program 44 is a program for setting the cache management table 51 (refer to FIG. 6) described later, and performing control for logically partitioning the cache memory 35 in the self storage apparatus. The logically partitioned area of the cache memory 35 is hereinafter referred to as a virtual cache. Each virtual cache is used only in a specified volume 32 associated in the cache management table 51, and is not used in the other volumes 32. The capacity of the virtual cache may be changed dynamically.

The storage logical partition management program 45 sets the virtual storage apparatus management table 52 (refer to FIG. 7) described later, and performs control for partitioning resources such as the volumes 32 and the cache memory 35 in the self storage apparatus into a plurality of logical partitions. A group of storage resources logically partitioned as described above is hereinafter referred to as a virtual storage apparatus.

Meanwhile, the memory 34 is provided with a configuration information storage area 46 for storing information concerning the configuration of the self storage apparatus, and the configuration information storage area 46 stores a volume management table 50, a cache management table 51, a virtual storage apparatus management table 52, a replication pair information table 53, and a resource allocation management table 54 shown in FIG. 5 to FIG. 9.

The volume management table 50 is a table to be used for the volume management program 41 to manage the volumes 32 existing in the self storage apparatus and, as shown in FIG. 5, is configured from a volume ID column 50A, a capacity column 50B, an attribute column 50C, a disk type column 50D, and an access computer ID column 50E.

The volume ID column 50A stores the identifier (hereinafter referred to as the "volume ID") such as a LUN (Logical Unit Number) of each volume 32 existing in the self storage apparatus, and the capacity column 50B stores the capacity of the corresponding volume 32. The attribute column 50C stores the attribute ("Normal" or "Pool") of the volume 32. "Normal" means that the volume 32 is a volume used by the first and/or second application servers 3, 4 for the reading and writing of data, and "Pool" means that the volume 32 is a volume to be used for temporarily storing the update differential data of asynchronous remote replication.

The disk type column 50D stores the attribute ("FC" or "SATA") of the physical storage device 30 providing the storage area in which the volume 32 is defined, and the access computer ID column 50E stores the identifier (hereinafter referred to as the "application server ID") of the first and/or second application server 3, 4 capable of reading and writing data from and into the volume 32.

Meanwhile, the cache management table 51 is a table to be used for the cache logical partition program 44 to manage the virtual cache allocated to the respective virtual storage apparatuses set in the self storage apparatus. The capacity of the virtual cache can be changed dynamically. The cache management table 51, as shown in FIG. 6, is configured from a virtual cache ID column 51A, a cache memory occupancy column 51B, and an allocated volume ID column 51C.

The virtual cache ID column 51A stores the identifier (hereinafter referred to as the "virtual cache ID") assigned to each virtual cache existing in the self storage apparatus, and the cache memory occupancy column 51B stores the occupancy of the virtual cache in relation to the capacity of the cache memory 35 in the self storage apparatus.

The allocated volume ID column 51C stores the volume ID of the volume 32 associated with the virtual cache (and which uses such virtual cache). The cache memory occupancy column 51B may also store the starting location and ending location of the storage area allocated with the respective virtual caches in the cache memory 35.

The virtual storage apparatus management table 52 is a table to be used for the storage logical partition program 45 to manage the respective virtual storage apparatuses set in the self storage apparatus and, as shown in FIG. 7, is configured from a virtual storage apparatus ID column 52A, an administrator ID column 52B, a virtual cache ID column 52C, and a volume ID column 52D.

The virtual storage apparatus ID column 52A stores the identifier (hereinafter referred to as the "virtual storage apparatus ID") assigned to the respective virtual storage apparatuses set in the self storage apparatus, and the administrator ID column 52B stores the identifier (hereinafter referred to as the "administrator ID") of the administrator of that virtual storage apparatus which is set separately from the administrator of the self storage apparatus.

The virtual cache ID column 52C stores the virtual cache ID of the virtual cache allocated to that virtual storage apparatus, and the volume ID column 52D stores the volume ID of all volumes existing in that virtual storage apparatus.

The virtual storage apparatus management table 52 may also include the occupancy in relation to the use of the CPU 33 (FIG. 4). For example, when assuming a configuration having a plurality of CPUs 33, it will be possible to provide processing that is not affected as a result of allocating a CPU 33 to each virtual storage apparatus.

The replication pair information table 53 is a table to be used for the replication control program 43 to control remote replication and, as shown in FIG. 8, is configured from a primary volume ID column 53A, a secondary volume ID column 53B, a pair status column 53C, another storage apparatus ID column 53D, and a replication group ID column 53E.

The primary volume ID column 53A stores the volume ID of the volume 32 that is a primary volume of any one of the replication pairs among the volumes 32 existing in the self storage apparatus, and the secondary volume ID column 53B stores the volume ID of the secondary volume in that replication pair.

The pair status column 53C stores the pair status of that replication pair. Here, as the pair status, there are "pair" showing a status where data replication from the primary volume to the secondary volume is complete and the primary volume and the secondary volume are mirrored, "copy" showing a status where data replication from the primary volume to the secondary volume is midway, and "suspend" showing a status where data replication from the primary volume to the secondary volume is not performed, and a snapshot at a certain point in time of the primary volume is created in the secondary volume.

The other storage apparatus ID column 53D stores the storage apparatus ID of the primary storage apparatus or the secondary storage apparatus (second or first storage apparatus 6, 5) retaining the primary volume or the secondary volume set in a storage apparatus other than the self storage apparatus of either the primary volume or the secondary volume forming that replication pair.

In this embodiment, one or more replication pairs are compiled as one group in business operation units (hereinafter referred to as the "replication group"), and a unique ID (hereinafter referred to as the "replication group ID") is assigned to each replication pair group. The replication group ID column 53E stores the replication group ID of the replication group to which the corresponding replication pair belongs.

Figures 9, 10:
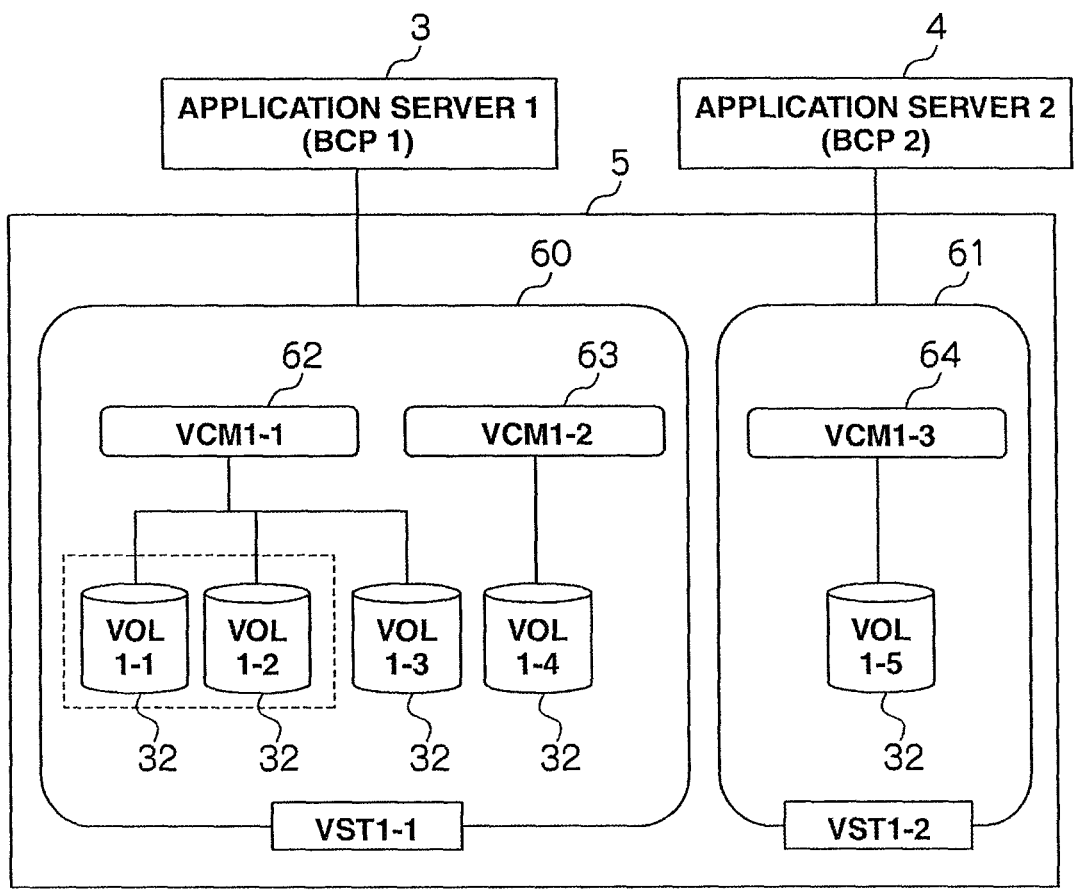
FIG. 9 is a chart showing the configuration of a resource allocation management table according to the first embodiment.
FIG. 10 is a block diagram explaining a virtual storage apparatus and a virtual cache.

The resource allocation management table 54 is a table for defining the capacity of the virtual cache to be used regarding the secondary volume in the secondary storage apparatus as described later and, as shown in FIG. 9, is configured from a normal condition occupancy column 54A and a takeover occupancy column 54B.

The normal condition occupancy column 54A stores the occupancy (hereinafter referred to as the "normal condition occupancy") in relation to the overall cache memory 35 of the virtual cache set regarding the secondary volume in the secondary storage apparatus during a normal condition, and the takeover occupancy column 54B stores the occupancy (hereinafter referred to as the "takeover occupancy") in relation to the overall cache memory 35 of the virtual cache set regarding the secondary volume in the secondary storage apparatus during a takeover.

Values of the normal condition occupancy and the takeover occupancy can be changed based on the management program 15 (FIG. 2) of the management computer 2, and may by set by the user with the management program 15, or automatically set by the management program 15 of the first and second storage apparatuses 5, 6 or the management computer 2 based on statistical information concerning the reading and writing of data of the first and second application servers 3, 4. Although this embodiment designates the capacity of the virtual cache during a normal condition and during a takeover with a ratio (occupancy in relation to the overall cache memory), this may also be designated with a specific numerical value if the primary storage apparatus knows the size of the cache memory 35 of the secondary storage apparatus.

(1-2) Flow of Replication Pair Configuration Processing in Present Embodiment

The flow of the replication pair configuration processing in the storage system 1 is now explained. In the ensuing explanation, let it be assumed that the relationship of performing remote replication is defined between the first and second storage apparatuses 5, 6 by the management program 15 of the management computer 2, and the first storage apparatus 5 is set to the status shown in FIG. 5, FIG. 6 and FIG. 7. The conceptual connection relationship between the first storage apparatus 5 and the first and second application servers 3, 4 is shown in FIG. 10.

In FIG. 10, virtual storage apparatuses 60, 61 respectively assigned with a virtual storage apparatus ID of "VST 1-1" and "VST 1-2" are set in the first storage apparatus 5, the first application server 3 assigned with an application server ID of "BCP1" is associated with the virtual storage apparatus 60, and the second application server 4 assigned with an application server ID of "BCP2" is associated with the virtual storage apparatus 61.

The virtual storage apparatus 60 of "VST 1-1" is allocated with the virtual caches 62, 63 respectively assigned with a virtual cache ID of "VCM 1-1" and "VCM 1-2," the virtual cache 62 of "VCM 1-1" is associated with three volumes 32 respectively assigned with a volume ID of "VOL 1-1," "VOL 1-2" and "VOL 1-3," and the virtual cache 63 of "VCM 1-2" is associated with one volume 32 assigned with a volume ID of "VOL 1-4."

The virtual storage apparatus 61 of "VST 1-2" is allocated with the virtual cache 64 assigned a virtual cache ID of "VCM 1-3," and the virtual cache 64 is associated with the volume 32 assigned a volume ID of "VOL 1-5." Here, let it be assumed that the volume 32 of "VOL 1-1" and the volume 32 of "VOL 1-2" are volumes to be used in the same business operation.

In the ensuing explanation, in order to differentiate the first and second storage apparatuses 5, 6, suffix "A" will be added to the corresponding reference numeral of the constituent components of the first storage apparatus 5, and suffix "B" will be added to the corresponding reference numeral of the constituent components of the second storage apparatus 6. For example, the volume 32 in the first storage apparatus 5 will be indicated as "volume 32A," and the volume 32 in the second storage apparatus 6 will be indicated as "volume 32B."

Figure 11:
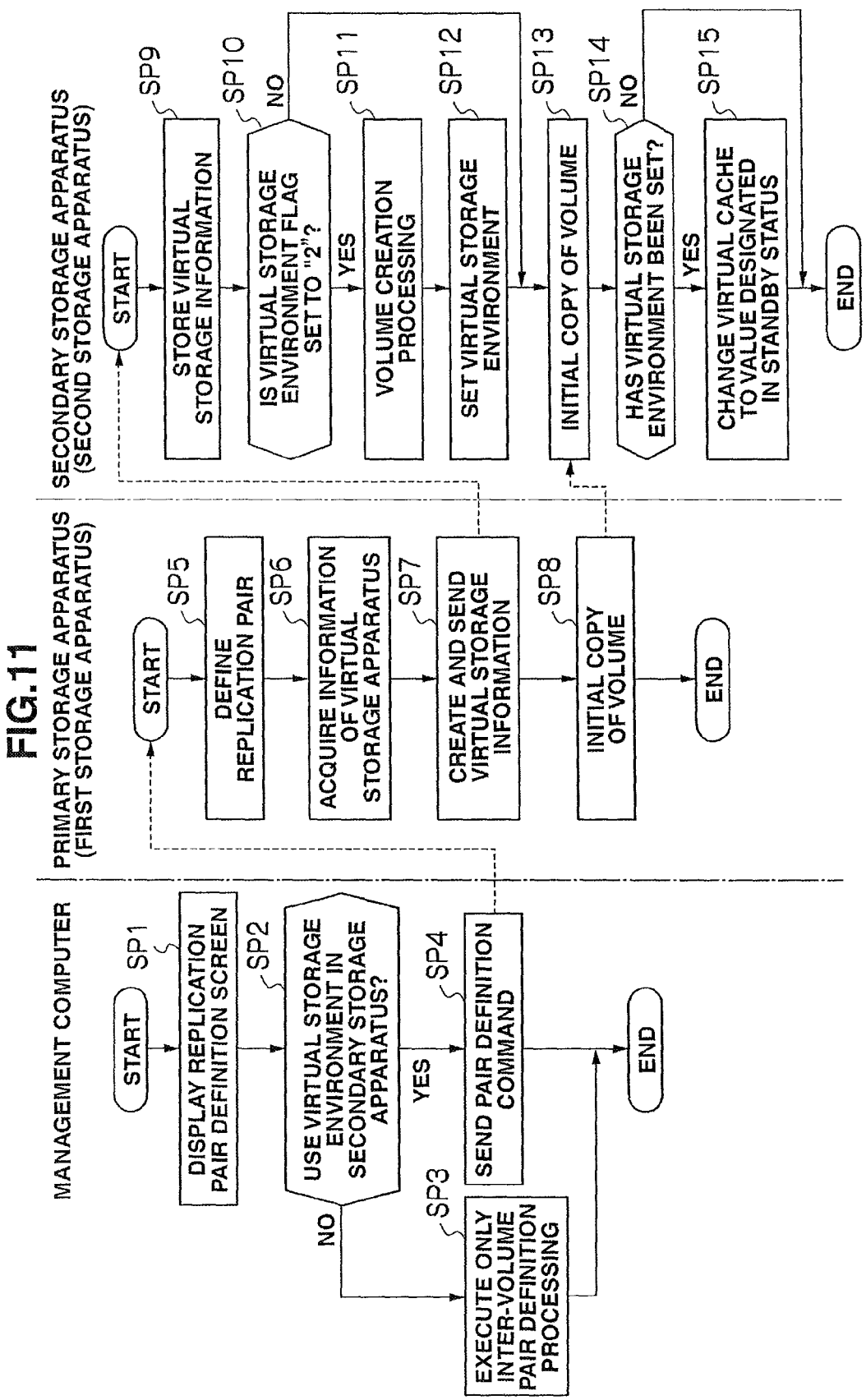
FIG. 11 is a flowchart explaining the replication pair configuration processing according to the first embodiment.

FIG. 11 shows the flow of the replication pair configuration processing where, in FIG. 10, the first storage apparatus 5 is set as the primary storage apparatus, the second storage apparatus 6 is set as the secondary storage apparatus, and the two volumes 32A of "VOL 1-1" and "VOL 1-2" in the first storage apparatus 5 are respectively configured as a replication pair with the respective volumes 32B of "VOL 2-1" and "VOL 2-2" in the second storage apparatus 6. Although the following explanation describes the "program" to be the processing entity in the various types of processing, in reality, it goes without saying that the CPU 10 of the management computer or the CPU 33A or 33B of the first or second storage apparatus 5, 6 executes the processing according to that program.

Here, the user boots the management program 15 of the management computer 2, and causes the management computer 2 to display a prescribed replication pair configuration screen (not shown) (SP1). The user thereafter uses the replication pair configuration screen to define a replication pair with the volume 32A of "VOL 1-1" in the first storage apparatus 5 as the replication source and the volume 32B of "VOL 2-1" in the second storage apparatus 6 as the replication destination, and a replication pair with the volume 32A of "VOL 1-2" in the first storage apparatus 5 as the replication source and the volume 32B of "VOL 2-2" in the second storage apparatus 6 as the replication destination. The user additionally sets the same replication group ID to these two replication pairs. Two replication pairs are set for the sake of the ensuing explanation, and this may be a single replication pair or three or more replication pairs.

Here, the management program 15 of the management computer 2 makes an inquiry to the user on whether to also use the configuration information (information concerning the virtual cache capacity, administrator and so on; hereinafter referred to as the "virtual storage apparatus environment") of the virtual storage apparatus, to which the volumes 32A of "VOL 1-1" and "VOL 1-2" in the first storage apparatus 5 as the primary volumes belong, in the second storage apparatus 6 as the replication destination (SP2). Specifically, the user is asked to select one from three options; namely, to notify the information of the corresponding virtual storage apparatus environment only to the secondary storage apparatus (option 1), to notify the information of the corresponding virtual storage apparatus environment to the secondary storage apparatus, and creates a virtual storage apparatus of the same virtual storage apparatus environment in the secondary storage apparatus (option 2), or not to notify the information of the corresponding virtual storage apparatus environment (option 3).

Figure 12:
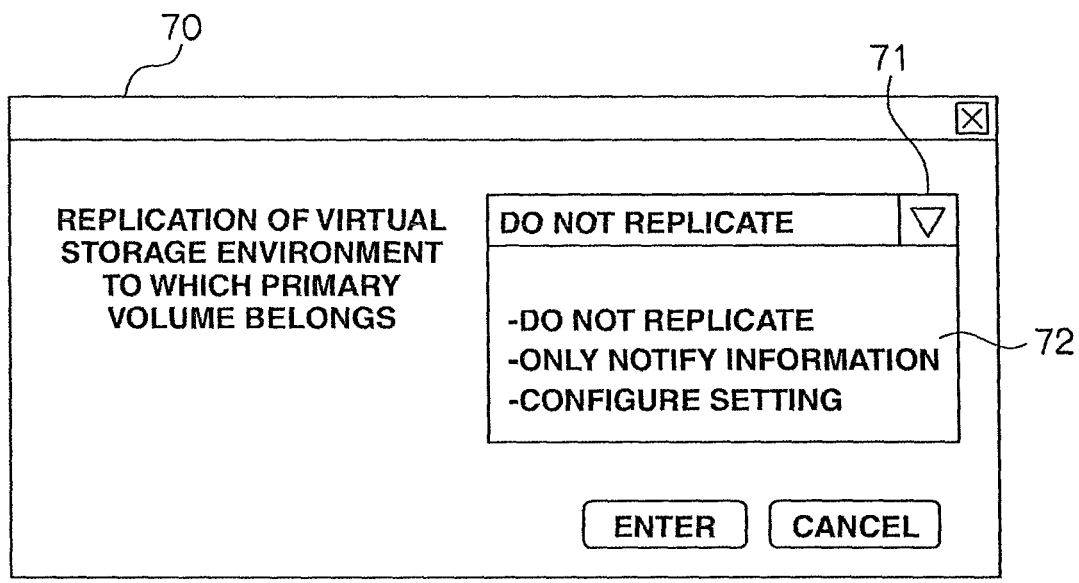
FIG. 12 is a schematic diagram showing the configuration of an inquiry window.

As the method of making an inquiry to the user, for example, the management computer 2 can be commanded to display an inquiry window 70 as shown in FIG. 12, and the user may selected a desired option among the three options in a pulldown menu 72 displayed by clicking a pulldown menu button 71 in the inquiry window 70, or the user may designate the option using a CUI (Character User Interface).

This kind of inquiry may be made upon configuring the replication pair, or upon creating a relationship of remote replication between the first and second storage apparatuses 5, 6. If the user selects the option (option 1) of notifying the information of the virtual storage apparatus environment only to the secondary storage apparatus among the three options described above in response to the inquiry, the user may also use the management program 15 of the management computer 2 to set the virtual storage apparatus of the virtual storage apparatus environment in the second storage apparatus 6 as the replication destination at an arbitrary timing in which the replication pair is of a "pair" status.

If the user selects option 3 in response to the inquiry (SP2; NO), the management program 15 commands the first and second storage apparatuses 5, 6 to configure the replication pair designated by the user using the replication pair configuration screen (SP3), performs the initial copy of volumes between the primary storage apparatus and the secondary storage apparatus based on the foregoing command, and then ends this replication pair configuration processing.

Meanwhile, if the user selects option 1 or option 2 in response to the inquiry (SP2; YES), the management program 15 creates a replication pair configuration information table 80 shown in FIG. 13 based on the definition information of the replication pair defined by the user using the replication pair configuration screen displayed at step SP1.

The replication pair configuration information table 80 is configured from a primary volume ID column 80A, a secondary volume ID column 80B, another storage apparatus ID column 80C, a replication group ID column 80D, and a virtual storage apparatus environment flag column 80E.

The primary volume ID column 80A, the secondary volume ID column 80B, the other storage apparatus ID column 80C and the replication group ID column 80D respectively store the volume ID of the primary volume, the volume ID of the secondary volume and the storage apparatus ID of the secondary storage apparatus (second storage apparatus 6) set by the user, and the replication group ID assigned to the replication group to which the replication pair to be configured belongs.

The virtual storage apparatus environment flag column 80E stores the number of the option ("1" in the case of option 1, "2" in the case of option 2) selected by the user in response to the inquiry. The replication pair configuration command table 80 may additionally including information concerning the replication type such as synchronous or asynchronous to be used in the configuration of the replication pair.

After the management program 15 of the management computer 2 creates a replication pair configuration command table 80 as shown in FIG. 13 where "VOL 1-1" and "VOL 1-2" are stored in the primary volume ID column 80A, "VOL 2-1" and "VOL 2-2" are stored in the secondary volume ID column 80C, the storage apparatus ID ("ST2") of the second storage apparatus 6 is stored in the other storage apparatus ID column 80C, the replication pair ID ("CG1") assigned to the respective replication pairs is stored in the replication group ID column 80D, and a virtual storage apparatus environment flag according to the option selected by the user is stored in the virtual storage apparatus environment flag column 80E, it sends this replication pair configuration command table 80 to the first storage apparatus 5 as the primary storage apparatus, and thereafter ends this sequential processing.

Meanwhile, the apparatus management program 40A of the first storage apparatus 5 that received the replication pair configuration command table 80 commands the replication control program 43A (FIG. 4) to configure the replication pair according to the replication pair configuration command table 80. The replication control program 43A that received this command refers to the replication pair configuration command table 80, and configures the foregoing replication pair by registering the necessary information in the replication pair information table 53 explained with reference to FIG. 8 (SP5).

Subsequently, the apparatus management program 40A reads the volume management table 50, the cache management table 51, the virtual storage apparatus management table 52, the replication pair information table 53 and the resource allocation management table 54 explained with reference to FIG. 5 to FIG. 9 stored in the configuration information storage area 46A (FIG. 4) of the memory 34A (FIG. 4) (SP6).

The apparatus management program 40A thereafter creates a virtual storage apparatus attribute table 81 shown in FIG. 14 and a virtual storage apparatus configuration table 82 shown in FIG. 15 based on the information of the respective tables obtained at step SP6.

Among the above, the virtual storage apparatus attribute table 81 is a table for notifying the virtual storage apparatus ID and the administrator of the virtual storage apparatus to which the primary volume belongs from the primary storage apparatus to the secondary storage apparatus, and is configured from a virtual storage apparatus ID column 81A and an administrator ID column 81B.

The virtual storage apparatus ID column 81A stores the virtual storage apparatus ID of the virtual storage apparatus to which the primary volume belongs, and the administrator ID column 81B stores the administrator ID of the administrator set regarding that virtual storage apparatus. Here, the virtual storage apparatus attribute table 81 is created where "VST 1-1" as the virtual storage apparatus ID of the virtual storage apparatus 60 shown in FIG. 10 is stored in the virtual storage apparatus ID column 81, and "AAA" as the administrator ID of the administrator of the virtual storage apparatus 60 is stored in the administrator ID column 81B.

The virtual storage apparatus configuration table 82 is a table for notifying the virtual storage apparatus environment of the virtual storage apparatus to which the primary volume belongs from the primary storage apparatus to the secondary storage apparatus, and is configured from a virtual cache ID column 82A, a cache occupancy column 82B, a volume ID column 82C, a replication group ID column 82D, a capacity column 82E, an attribute column 82F, a disk type column 82G, and an access computer ID column 82H.

The virtual cache ID column 82A stores the virtual cache ID of all virtual caches created in the virtual storage apparatus to which the primary volume belongs. The cache occupancy column 82B is divided into a normal condition column 82BX and a takeover column 82BY, and the normal condition column 82BX stores the occupancy during a normal condition described above in relation to the corresponding cache memory 35, and the takeover column 82BY stores the occupancy during a takeover described above in relation to that cache memory 35.

The volume ID column 82C, the capacity column 82E, the attribute column 82F, the disk type column 82G and the access computer ID column 82H respectively store information of the corresponding column in the volume management table 50 (FIG. 5), and the replication group ID column 82D stores information of the replication group ID column 53E in the replication pair information table 53 (FIG. 8). Accordingly, the virtual storage apparatus configuration table 82 as shown in FIG. 15 will be created in the example of FIG. 10.

After the apparatus management program 40A creates the virtual storage apparatus attribute table 81 and the virtual storage apparatus configuration table 82, it sends these two tables and the replication pair configuration command table 80 sent from the management computer 2 to the second storage apparatus 6 as the secondary storage apparatus (SP7).

The apparatus management program 40A thereafter commands the replication control program 43A (FIG. 4) to execute initial copy from the corresponding primary volume to the secondary volume. Consequently, the replication control program 43A, jointly with the replication control program 43B in the second storage apparatus 6, executes initial copy regarding all primary volumes ("VOL 1-1," "VOL 1-2," "VOL 1-3" and "VOL 1-4") registered in the virtual storage apparatus configuration table 82 when the virtual storage apparatus environment flag stored in the replication pair configuration command table 80 (FIG. 13) is "2," and executes initial copy only to the primary volumes ("VOL 1-1" and "VOL 1-2") designated in the replication pair configuration command table 80 when the virtual storage apparatus environment flag is "1" (SP8). The replication source apparatus management program 40A thereafter ends this sequential processing.

Meanwhile, the apparatus management program 40B of the second storage apparatus 6 that received the foregoing virtual storage apparatus attribute table 81 (FIG. 14) and the virtual storage apparatus configuration table 82 (FIG. 15) stores such received virtual storage apparatus attribute table 81 and virtual storage apparatus configuration table 82 in the configuration information storage area 35B (FIG. 4) of the memory 34B (FIG. 4) (SP9).

Here, the apparatus management program 40B may refer to the virtual storage apparatus configuration table 82 (FIG. 15) and the volume management table 50 (FIG. 5) and, if the disk type of the replication source is a SATA disk and the disk type of the replication destination is an FC disk or the like and the performance of the replication source is inferior to the performance of the replication destination, it may notify the management program 15 of the management computer 2 to such effect. The management program 15 of the management computer 2 that received such notice may warn the user of this status by displaying a dialog on a screen.

Subsequently, the apparatus management program 40B refers to the virtual storage apparatus environment flag of the replication pair configuration command table 80 (FIG. 13), and determines whether the virtual storage apparatus environment flag is "2" (SP10). If the virtual storage apparatus environment flag is "2" (SP10; NO), the apparatus management program 40B proceeds to step SP13.

Contrarily, if the virtual storage apparatus environment flag is "1" (SP10; YES), the apparatus management program 40B sets the virtual storage apparatus environment to which the primary volume belongs in the second storage apparatus 6 at subsequent step SP11 and step SP12.

Specifically, the apparatus management program 40B commands the volume management program 41B to create a secondary volume. Consequently, the volume management program 41B creates a secondary volume based on the virtual storage apparatus configuration table 82 and the replication pair configuration command table 80 (SP11).

The apparatus management program 40B respectively commands the volume management program 41B, the cache logical partition management program 44B and the storage logical partition management program 45B to set the volumes 32B, create virtual caches, and create virtual storage apparatuses. Consequently, the volume management program 41B, the cache logical partition management program 44B and the storage logical partition management program 45B respectively set the necessary volumes 32B, create virtual caches, and create virtual storage apparatuses based on the virtual storage apparatus configuration table 82 and the replication pair configuration command table 80. Moreover, the apparatus management program 40B sets the administrator of the virtual storage apparatus created by the storage logical partition management program 45 based on the virtual storage apparatus attribute table 81 (i.e., registers the administrator ID of that administrator in the corresponding administrator ID column 52B of the virtual storage apparatus management table 52 (FIG. 7)) (SP12).

Subsequently, the apparatus management program 40B commands the replication control program 43B (FIG. 4) to execute initial copy regarding the respective replication pairs that have been set. Consequently, the replication control program 43B, jointly with the replication control program 43A of the first storage apparatus 5, executes initial copy regarding all volumes 32A ("VOL 1-1," "VOL 1-2," "VOL 1-3," "VOL 1-4") registered in the virtual storage apparatus configuration table 81 (FIG. 14) when the virtual storage apparatus environment flag stored in the replication pair configuration command table 80 (FIG. 13) is "2," and executes initial copy only regarding the volumes 32A ("VOL 1-1," "VOL 1-2") designated in the replication pair configuration command table 80 when the virtual storage apparatus environment flag is "1" (SP13).

Subsequently, the apparatus management program 40B once again determines whether the virtual storage apparatus environment flag is "2" (SP14), and, upon obtaining a negative result (SP14; NO), ends this replication pair configuration processing. Contrarily, if the apparatus management program 40B obtains a positive result in this determination (SP14; YES), it commands the cache logical partition management program 44B to change the ratio of the virtual cache used by the secondary volume created at step SP11 among the overall cache memory 35B (FIG. 4) to the normal condition occupancy designated in the virtual storage apparatus configuration table 81 (SP15). The apparatus management program 40B thereafter ends this replication pair configuration processing.

As a result of the sequential replication pair configuration processing described above, a replication pair of the volume 32A having a volume ID of "VOL 1-1" in the first storage apparatus 5 as the primary storage apparatus and the volume 32B having a volume ID of "VOL 2-1" in the second storage apparatus 6 as the secondary storage apparatus, and a replication pair of the volume 32A having a volume ID of "VOL 1-2" in the first storage apparatus 5 and the volume 32B having a volume ID of "VOL 2-1" in the second storage apparatus 6 are set.

The flow of takeover processing where a failure occurs in the volume 32A in the first storage apparatus 5 as the primary storage apparatus, and the access destination of the first and second application servers 3, 4 is changed to the volume 32B in the second storage apparatus 6 forming a replication pair with that volume 32A is now explained. Here, the explanation is based on the assumption that a failure occurred in the volume 32A having a volume ID of "VOL 1-1."

Figure 16:
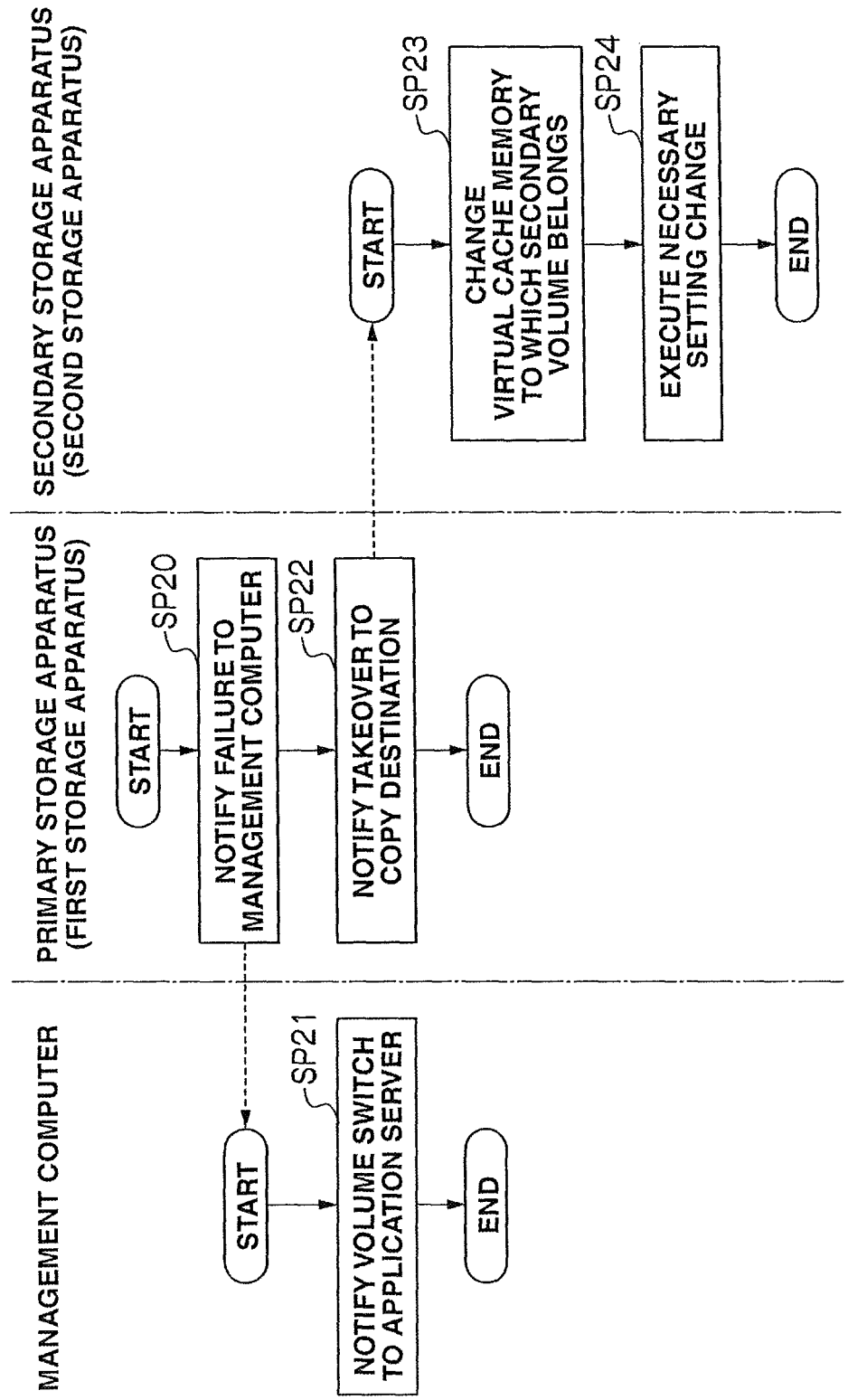
FIG. 16 is a flowchart showing the processing routine to be performed during a takeover according to the first embodiment.

When the failure detection program 42A detects a failure in the volume 32A of "VOL 1-1" in the first storage apparatus 5, the takeover processing shown in FIG. 16 is started, and, foremost, the failure detection program 42A notifies the apparatus management program 40A and the management program 15 of the management computer 2 (FIG. 2) via the apparatus management program 40A that a failure occurred in the volume 32A of "VOL 1-1" (SP20).

When the management program 15 receives the foregoing notice, it boots the takeover program 14 (FIG. 2). The takeover program 14 commands the takeover cooperative program 25 (FIG. 3) of the first or second application server 3, 4 to switch the access destination of the access to the volume 32A of "VOL 1-1" to the volume 32B in the second storage apparatus 6 configured as a replication pair with that volume 32A, and notifies the user that a failure occurred in the volume 32A by displaying a warning dialog or the like (SP21).

Meanwhile, when the apparatus management program 40A of the first storage apparatus 5 receives a failure notice from the failure detection program 42A, it commands the replication control program 43A to execute the takeover processing. The replication control program 43A that received this command refers to the replication pair information table 53 (FIG. 8), and notifies the second storage apparatus 6 to execute the takeover processing to the volume 32A of "VOL 1-1" that was subject to a failure, and to the volume 32A of "VOL 1-2" belonging to the same replication group as the volume 32A (SP22).

Here, the replication control program 34A of the first storage apparatus 5 may notify the second storage apparatus 6 of only the volume 32A of "VOL 1-1" that was subject to a failure, and the replication control program 43B of the second storage apparatus 6 may refer to the replication pair information table 53 in the self storage apparatus and determine the volume 32B to take over.

Meanwhile, the apparatus management program 40B of the second storage apparatus 6 that received the foregoing notice commands the cache logical partition program 44B to change the capacity of the virtual cache being used by the volume 32B of "VOL 2-1" and the volume 32B of "VOL 2-2" that are respectively configured as a replication pair with the volume 32A of "VOL 1-1" and the volume 32A of "VOL 1-2." The cache logical partition program 44B changes the capacity of the virtual cache to a capacity according to the cache occupancy during a takeover registered in the virtual storage apparatus configuration table 82 (FIG. 15) (SP23).

The apparatus management program 40B commands the volume management program 50B to change the setting so that the first or second application server 3, 4 can read and write data from and into the respective volumes 32B of "VOL 2-1" and "VOL 2-2" of the takeover destination. The volume management program 50B thereby changes the setting as necessary according to the foregoing command (SP24).

Although the foregoing takeover processing is performed in units of replication groups to which the failed volume belongs, the takeover processing may also be performed in volume units using a single volume or a virtual cache.

The cache occupancy used upon changing the capacity of the virtual cache of the second storage apparatus 6 was calculated by the apparatus management program 40B based on the cache occupancy (cache management table 51) of the virtual cache being used by the volume 32 of "VOL 1-1" and the volume 32A of "VOL 1-2" in the first storage apparatus 5, and the resource allocation management table 54 (FIG. 9).

In the case of this example, for instance, when referring to the cache management table 51 (FIG. 6), the virtual cache being used by the volume 32A of "VOL 1-1" accounts for 40% of the overall cache memory 35A of the first storage apparatus 5. Moreover, when referring to the resource allocation management table 54, the occupancy is 50% during a normal condition and 100% during a takeover. Based on the above, the cache occupancy is 20% during a normal condition from the calculation of 50% of the virtual cache occupancy of 40%, and the cache occupancy is 40% during a takeover from the calculation of 100% of the virtual cache occupancy of 40%. The cache occupancies calculated as described above are respectively stored in the normal condition column 82BX and the takeover column 82BY of the virtual storage apparatus configuration table 82 (FIG. 15).

FIG. 17 shows the cache occupancy of the cache memory 35B in the second storage apparatus 6 before and after the takeover processing in the case of executing such takeover processing upon setting the virtual storage apparatus environment of the virtual storage apparatus in the first storage apparatus 5 to the second storage apparatus 6 as the secondary storage apparatus.

As evident from FIG. 17, when the replication pair is of a normal condition, the ratio of the unused cache memory 35B will increase, and the second storage apparatus 6 will be able to use 70% of the unused cache memory 35B for a different objective (refer to "unused cache" column). This is because when the secondary volume is of a "pair" status, there is no processing for reading or writing data from the first and/or second application server 3, 4, and the virtual cache allocated to the secondary volume can be reduced.

In addition, power saving can also be realized by turning off the power of the volume 32B or the cache memory 35B which is not being used by the virtual storage apparatus in the second storage apparatus 6 or by any other storage apparatus.

(1-3) Effect of Present Embodiment

With the storage system 1 according to the present embodiment, since information (configuration information of the virtual storage apparatus) of the virtual storage apparatus environment to which the primary volume in the primary storage apparatus belongs is sent from the primary storage apparatus to the secondary storage apparatus, and, based on information of this virtual storage apparatus environment, a virtual storage apparatus having the same configuration as the virtual storage apparatus to which the primary volume belongs is created in the secondary storage apparatus as the virtual storage apparatus to which the secondary volume belongs, a virtual storage apparatus to which the secondary volume belongs can be created in the secondary storage apparatus without having to trouble the user.

Thus, with this storage system 1, a virtual storage apparatus environment that is the same as the virtual storage apparatus in the primary storage apparatus can be set in the secondary storage apparatus with ease and in a short amount of time.

Further, with the storage system 1, since two capacities; namely, one during a normal condition and one during a takeover are prepared as the capacity of the virtual cache of the virtual storage apparatus to be set in the secondary storage apparatus, and the capacity of the virtual cache during a normal condition is set to be smaller than the capacity of the virtual cache during a takeover, it is possible to prevent the allocation of unnecessary capacity to the respective virtual caches in the secondary storage apparatus during a normal condition.

(2) Second Embodiment (2-1) Configuration of Storage System in Present Embodiment The second embodiment is now explained. In the second embodiment, the management computer initiates the notification of the virtual storage apparatus environment and the setting of the virtual storage apparatus that were initiated by the secondary storage apparatus in the first embodiment. As a result of the management program operating in the management computer additionally creating the virtual storage apparatus environment of the virtual storage apparatus to which the primary volume belongs in the secondary storage apparatus during the configuration of the replication pair of volumes, as with the first embodiment, the same virtual storage apparatus environment as the virtual storage apparatus in the primary storage apparatus can be set in the secondary storage apparatus with ease and in a short amount of time.

Figure 18:
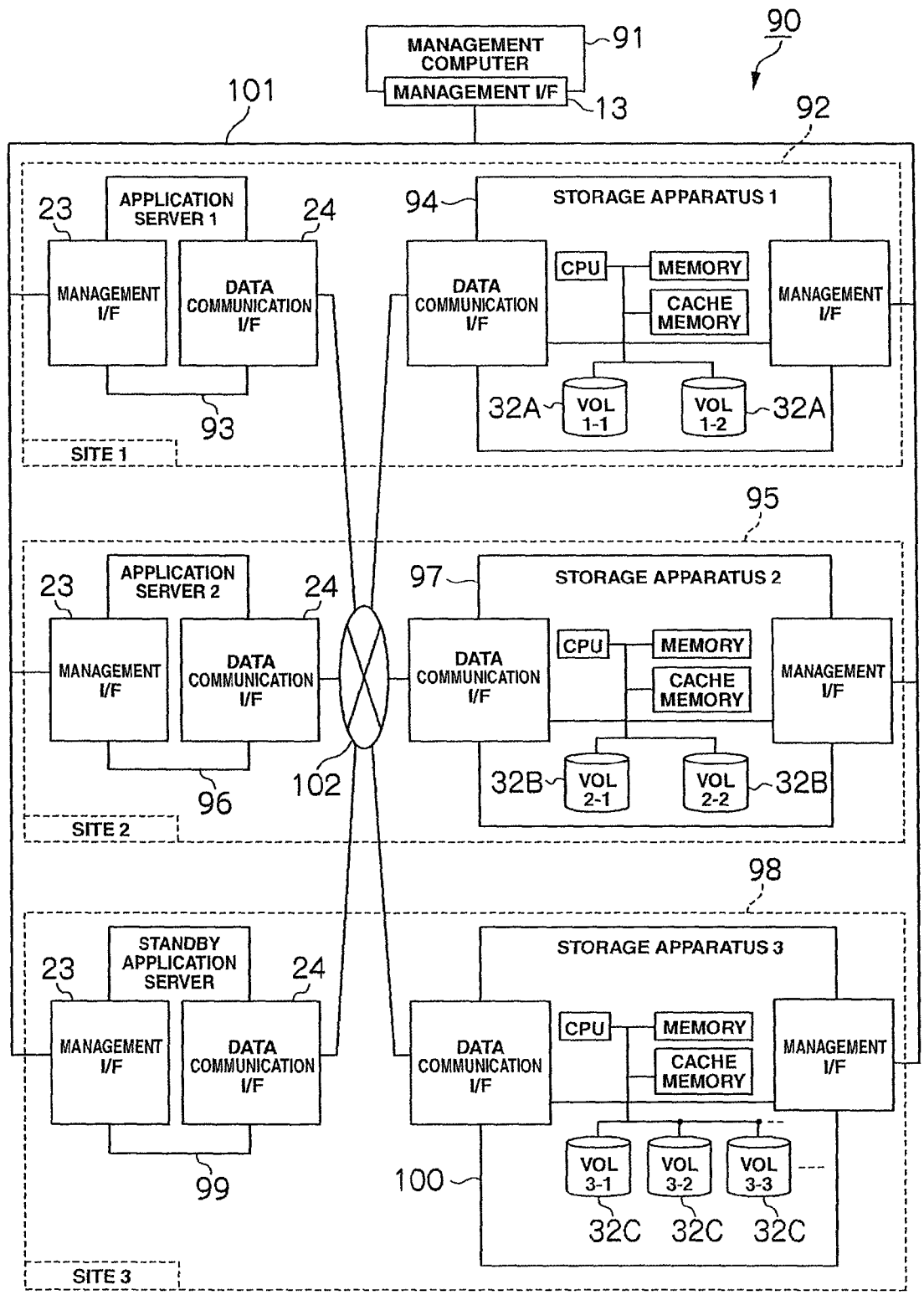
FIG. 18 is a block diagram showing the overall configuration of a storage system according to the second to fourth embodiments.

FIG. 18 shows the configuration of a storage system 90 according to the second embodiment. The storage system 90 is configured by a management computer 91, a first application server 93 and a first storage apparatus 94 respectively installed at a first site 92, a second application server 96 and a second storage apparatus 97 respectively installed at a second site 95, and a standby application server 99 and a third storage apparatus 100 respectively installed at a third site 98 being connected via a management network 101, and the first and second application servers 93, 96, the standby application server 99, and the first to third storage apparatuses 94, 97, 100 being connected via a data communication network 102.

Here, in order to continue business operations even during a disaster such as an earthquake, the standby storage apparatus and the application server must be installed at remote locations that will not be affected by the disaster, and each of these locations is referred to as a site. The number of application servers, storage apparatuses and sites in this configuration was set for the sake of explanation, and the number is not limited thereto.

Figure 19:
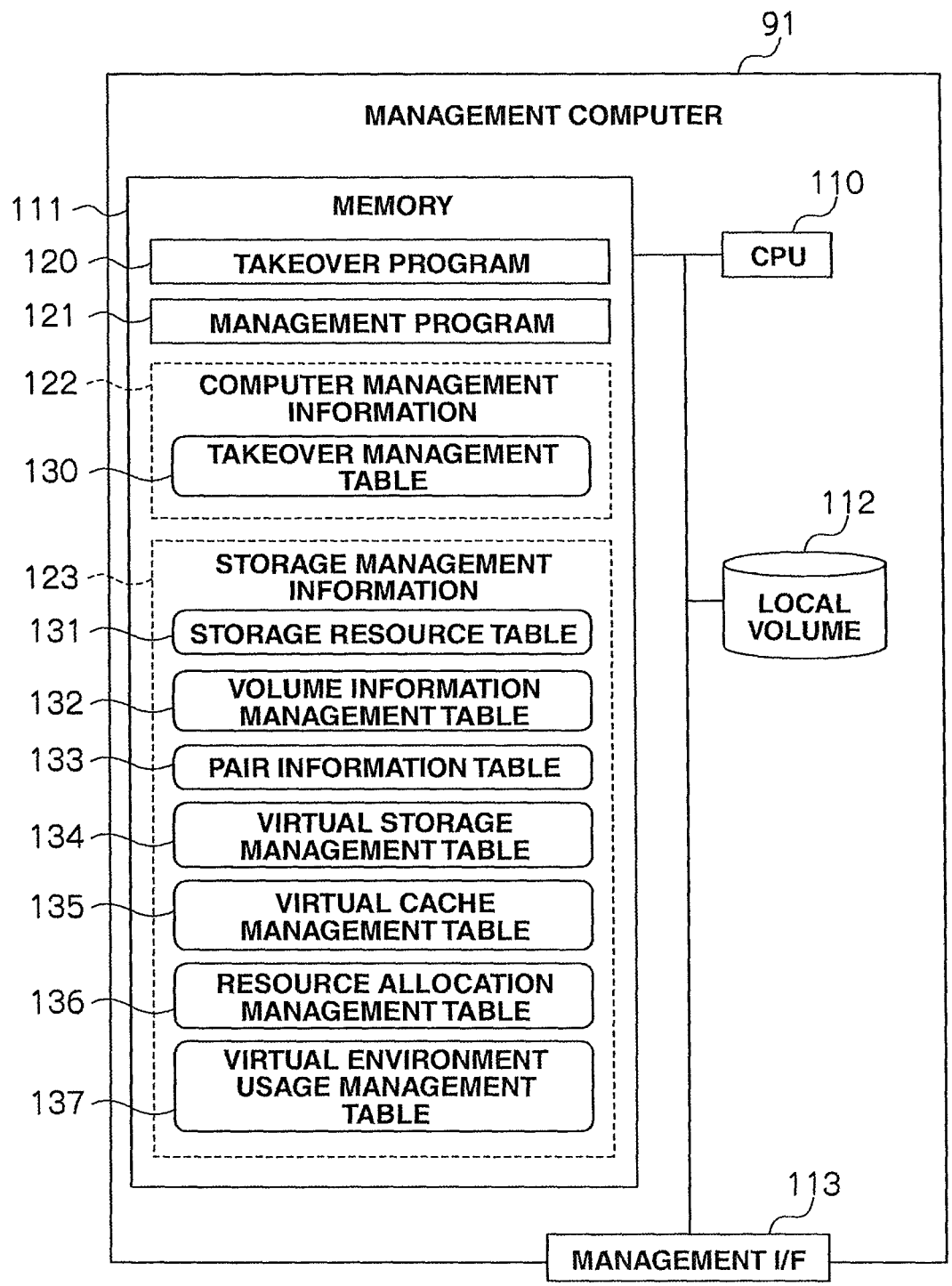
FIG. 19 is a block diagram showing the internal configuration of a management computer according to the second embodiment.

The management computer 91, as shown in FIG. 19, comprises a CPU 110, a memory 111, a disk apparatus 112 and a management interface 113. The CPU 110, the memory 111, the disk apparatus 112 and the management interface 113 respectively have the same functions as the CPU 10, the memory 11, the disk apparatus 12 and the management interface 13 of the management computer 2 according to the first embodiment explained with reference to FIG. 2.

In the case of this embodiment, however, the memory 111 stores a takeover program 120, a management program 121, computer management information 122, and storage management information 123.

The takeover program 120 is the same as the takeover program 14 (FIG. 2) according to the first embodiment, and the management program 120 is a program for the management computer 91 to manage the first and second application servers 93, 96, the standby application server 99, and the first to third storage apparatuses 94, 97, 100 via the management network 101.

The management program 121 has the function of creating volumes, setting attributes, setting and changing the virtual apparatuses and virtual caches, and detecting failures in the first to third storage apparatuses 94, 97, 100, and detecting failures, and notifying information concerning the failure for managing the takeover destination to the takeover program 120 operating in the same management computer 91 regarding the first and second application servers 93, 96 and the standby application server 99. The management program 121 also uses the storage management information 123 to manage the virtual storage apparatuses, the virtual caches, and the volumes.

The computer management information 122 is configured from a takeover management table 130. Details concerning the takeover management table 130 will be described later. The storage management information 123 is configured from a storage resource table 131, a volume information management table 132, a replication pair information table 133, a virtual storage apparatus management table 134, a virtual cache management table 135, a resource allocation management table 136, and a virtual environment usage management table 137. Details concerning these tables will also be described later.

Figure 20:
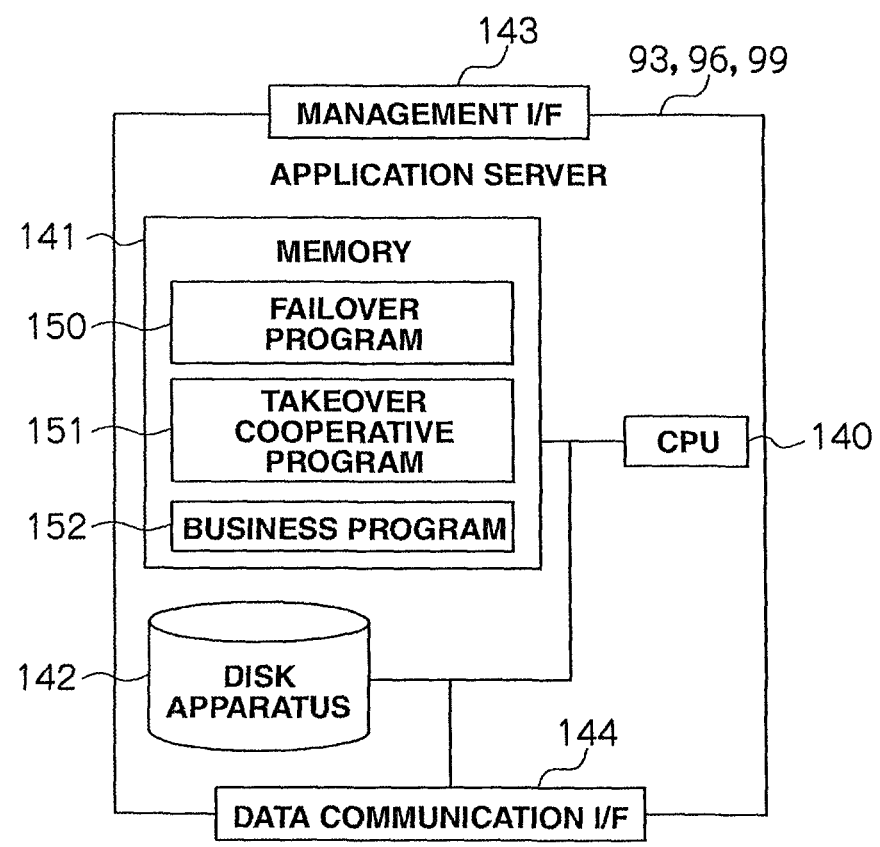
FIG. 20 is a block diagram showing the internal configuration of the first and second application servers and a standby application server according to the second embodiment.

The first application server 93, as shown in FIG. 20, comprises a CPU 140, a memory 141, a disk apparatus 142, a management interface 143, and a data communication interface 144. The CPU 140, memory 141, the disk apparatus 142, the management interface 143 and the data communication interface 144 respectively have the same functions as the CPU 20, the memory 21, the disk apparatus 22, the management interface 23 and the data communication interface 24 of the first and second application servers 3, 4 according to the first embodiment explained with reference to FIG. 3.

Nevertheless, in the case of this embodiment, the memory 141 of the first and second application servers 3, 4 stores a failover program 150 in addition to a takeover cooperative program 151 and a business program 152 having the same functions as the takeover cooperative program 25 and the business program 26 according to the first embodiment. The failover program 150 is a program for executing the failover processing which switches the processing of the first application server 93 to the standby application server 99.

The second application server 96 is basically configured the same as the first application server 93, but is not loaded with the failover program 124. The standby application server 99 is configured the same as the first application server 93, and is used as a substitute computer when a failure occurs in the first application server 93. Thus, the standby application server 99 is also loaded with the failover program 150. The failover program 150 in the standby application server 99 monitors the first application server 93, and has the function of executing the processing for turning over the business operation of the first application server 93 to the standby application server 99 upon detecting the occurrence of a failure.

Figure 21:
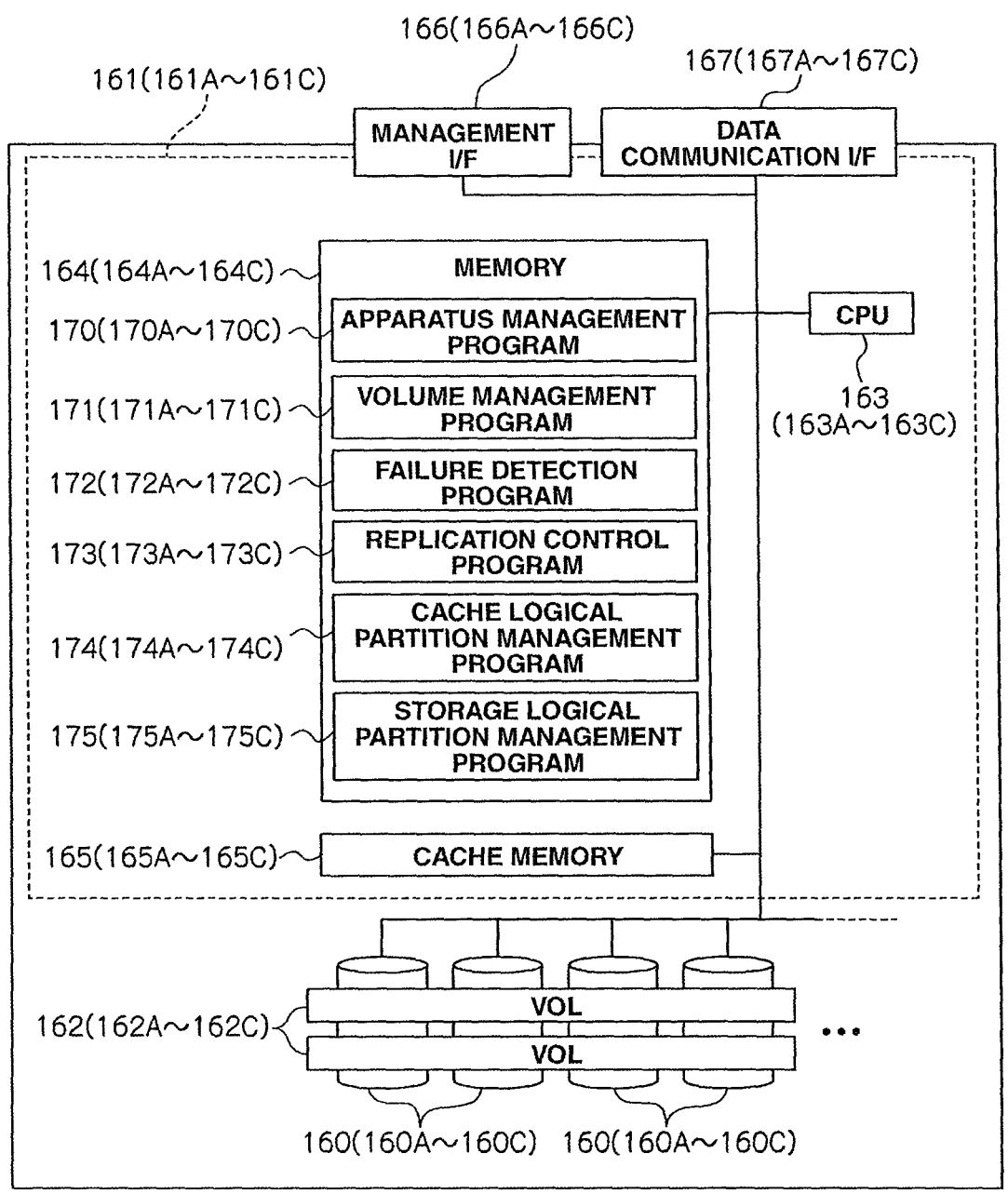
FIG. 21 is a block diagram showing the internal configuration of the first to third storage apparatuses according to the second embodiment.

The first to third storage apparatuses 94, 97, 100, as shown in FIG. 21, is configured from a plurality of physical storage devices 160 and a control unit 161. The physical storage devices 160 are the same as the physical storage devices 30 of the first and second storage apparatuses 5, 6 according to the first embodiment explained with reference to FIG. 4. One or more volume 162 are set in a physical storage area provided by one or more physical storage disks 160. Data is stored in logical block units in the volumes 162.

The control unit 161 comprises a CPU 163, a memory 164, a cache memory 165, a management interface 166 and a data communication interface 167. The CPU 163, the memory 164, the cache memory 165, the management interface 166 and the data communication interface 167 respectively have the same functions as the CPU 33, the memory 34, the cache memory 35, the management interface 36 and the data communication interface 37 of the first and second storage apparatuses 5, 6 according to the first embodiment explained with reference to FIG. 4.

The memory 164 stores an apparatus management program 170, a volume management program 171, a failure detection program 172, a replication control program 173, a cache logical partition management program 174, and a storage logical partition management program 175 having the same functions as the corresponding programs of the first embodiment. Each program of this embodiment, however, is executed based on a command from the management computer. In the case of this embodiment, the memory 164 is not provided with the configuration information storage area 46 shown in FIG. 4.

Configuration of the respective tables stored in the memory 11 of the management computer 91 according to the present embodiment is now explained. FIG. 22 to FIG. 29 respectively show the takeover management table 130, the storage resource table 131, the volume information management table 132, the replication pair information table 133, the virtual storage apparatus management table 134, the virtual cache management table 135, the resource allocation management table 136, and the virtual environment usage management table 137 stores in the memory 111 of the management computer 91.

The takeover management table 130 is a table for managing the replication pairs and the application servers 93, 96 that use the primary volume of such replication pairs and, as shown in FIG. 22, is configured from a replication pair ID column 130A and an application server ID column 130B.

The replication pair ID column 130A stores the replication pair IDs of all replication pairs existing in the storage system 90, and the application server ID column 130B stores the application server ID of the first and/or second application servers 93, 96 using the primary volume of the corresponding replication pair for reading and writing data.

The storage resource table 131 is a table for the management computer 91 to manage the storage apparatuses (first to third storage apparatuses) 94, 97, 100 connected to itself and, as shown in FIG. 23, is configured from a storage apparatus ID column 131A, a cache memory ID column 131B, a total cache capacity column 131C, and a total volume capacity column 131D.

The storage apparatus ID column 131A stores the storage apparatus ID of the respective storage apparatuses 94, 97, 100. The cache memory ID column 131B stores the cache memory ID assigned to the cache memory 165 in the storage apparatuses 94, 97, 100. The total cache capacity column stores the total capacity of the cache memory 165, and the total volume capacity column 114D stores the total capacity of all volumes 162 existing in the storage apparatuses 94, 97, 100.

The volume information management table 132, as shown in FIG. 24, is configured from a volume ID column 132A, a storage apparatus ID column 132B, a capacity column 132C, an attribute column 132D, a disk type column 132E, and an access computer ID column 132F. The volume ID column 132A, the capacity column 132C, the attribute column 132D, the disk type column 132E and the access computer ID column 132F respectively store the same information as the corresponding columns 50A to 50E of the volume management table 50 according to the first embodiment explained with reference to FIG. 5, and the storage apparatus ID column 132B stores the storage apparatus ID of the storage apparatuses 94, 97, 100 retaining the corresponding volume 162.

The replication pair information management table 133, as shown in FIG. 25, is configured from a replication pair ID column 133A, a primary storage apparatus ID column 133B, a primary volume ID column 133C, a secondary storage apparatus ID column 133D, a secondary volume ID column 133E, a pair status column 133F, and a replication group ID column 133G. The primary volume ID column 133C, the secondary storage apparatus ID column 133D, the secondary volume ID column 133E, the pair status column 133F, and the replication group ID column 133G store the same information as the corresponding columns 53A to 53E of the replication pair information table 53 according to the first embodiment explained with reference to FIG. 8. The replication pair ID column 133A stores the replication pair ID assigned to the corresponding replication pair, and the primary storage apparatus ID column 133B stores the storage apparatus ID of the storage apparatuses 94, 97, 100 retaining the primary volume.

The virtual storage apparatus management table 134, as shown in FIG. 26, is configured from a virtual storage apparatus ID column 134A, a storage apparatus ID column 134B, an administrator ID column 134C, a virtual cache ID column 134D, and a volume ID column 134E. The virtual storage apparatus ID column 134A, the administrator ID column 134C, the virtual cache ID column 134D and the volume ID column 134E store the same information as the corresponding columns 52A to 52D of the virtual storage apparatus management table 52 according to the first embodiment explained with reference to FIG. 7. The storage apparatus ID column 134A stores the storage apparatus ID of the storage apparatuses 94, 97, 100 to which the corresponding virtual storage apparatus is set.

Meanwhile, the virtual cache management table 135, as shown in FIG. 27, is configured from a virtual cache ID column 135A, a storage apparatus ID column 135B, a cache memory occupancy column 135C, a volume ID column 135D, and a status column 135E.

The virtual cache ID column 135A stores the cache memory ID assigned to the virtual cache managed by the management program 121 (FIG. 19), and the storage apparatus ID column 135B stores the storage apparatus ID of the storage apparatuses 94, 97, 100 retaining the virtual cache. The cache memory occupancy column 135C stores the current capacity of the corresponding virtual cache, and the volume ID column 135D stores the volume ID of each volume 162 associated with the corresponding virtual cache.

The status column 135E stores the status of the corresponding virtual cache. Specifically, information of "passive" which means that there is no reading or writing of data from the first or second application server 93, 96 to the volume 162 associated with the virtual cache (that is, when the volume 162 corresponding to a secondary volume of the replication pair) is stored, and information of "active" meaning that there is reading or writing of data from the first or second application server 93, 96 to the volume 162 (that is, when the volume 162 corresponds to a primary volume of the replication pair) is stored. Nevertheless, when data is read from or written into the volume 162 in backup processing or the like, the status of the virtual cache used by the volume 162 can be set to "passive" even if it is a replication source.

The resource allocation management table 136, as shown in FIG. 28, is configured from a virtual cache ID column 136A, a storage apparatus ID column 136B, and a cache memory occupancy column 136C. The virtual cache ID column 136A stores the virtual cache ID of each virtual cache managed by the management program 121 of the management computer 91, and the storage apparatus ID column 136B stores the storage apparatus ID of the storage apparatus retaining the corresponding virtual cache.

The cache memory occupancy column 136C is divided into a "passive" column 136CX and an "active" column 136CY, and the "passive" column 136CX stores the capacity occupied by the cache memory 165 in the corresponding storage apparatuses 94, 97, 100 when the corresponding virtual cache is of a "passive" status, and the "active" column 119CY stores the capacity occupied by the cache memory 165 when the virtual cache is of an "active" status. The "passive" column 136CX and the "active" column 136CY respectively correspond to the normal condition column 54A and the takeover column 54B of the resource allocation management table 54 according to the first embodiment explained with reference to FIG. 9. The virtual cache used by the primary volume is constantly "active," and let it be assumed that the same value as the cache memory occupancy is set in both the "active" column 136CX and the "passive" column 136CY.

The virtual environment usage management table 137, as shown in FIG. 29, is configured from a replication pair ID column 137A and a virtual storage usage flag column 137B. The replication pair ID column 137A stores the replication pair ID of each replication pair managed by the management program 121 of the management computer 91, and the virtual storage usage flag column 137B stores a flag (hereinafter referred to as the "virtual storage usage flag") representing whether the virtual storage apparatus environment is to be used in the second volume when a takeover occurs to the corresponding replication pair. The virtual storage usage flag is set to "0" when nothing is to be done, and set to "1" when the virtual storage apparatus environment is to be reproduced in the replication destination during a takeover.

Figure 30:
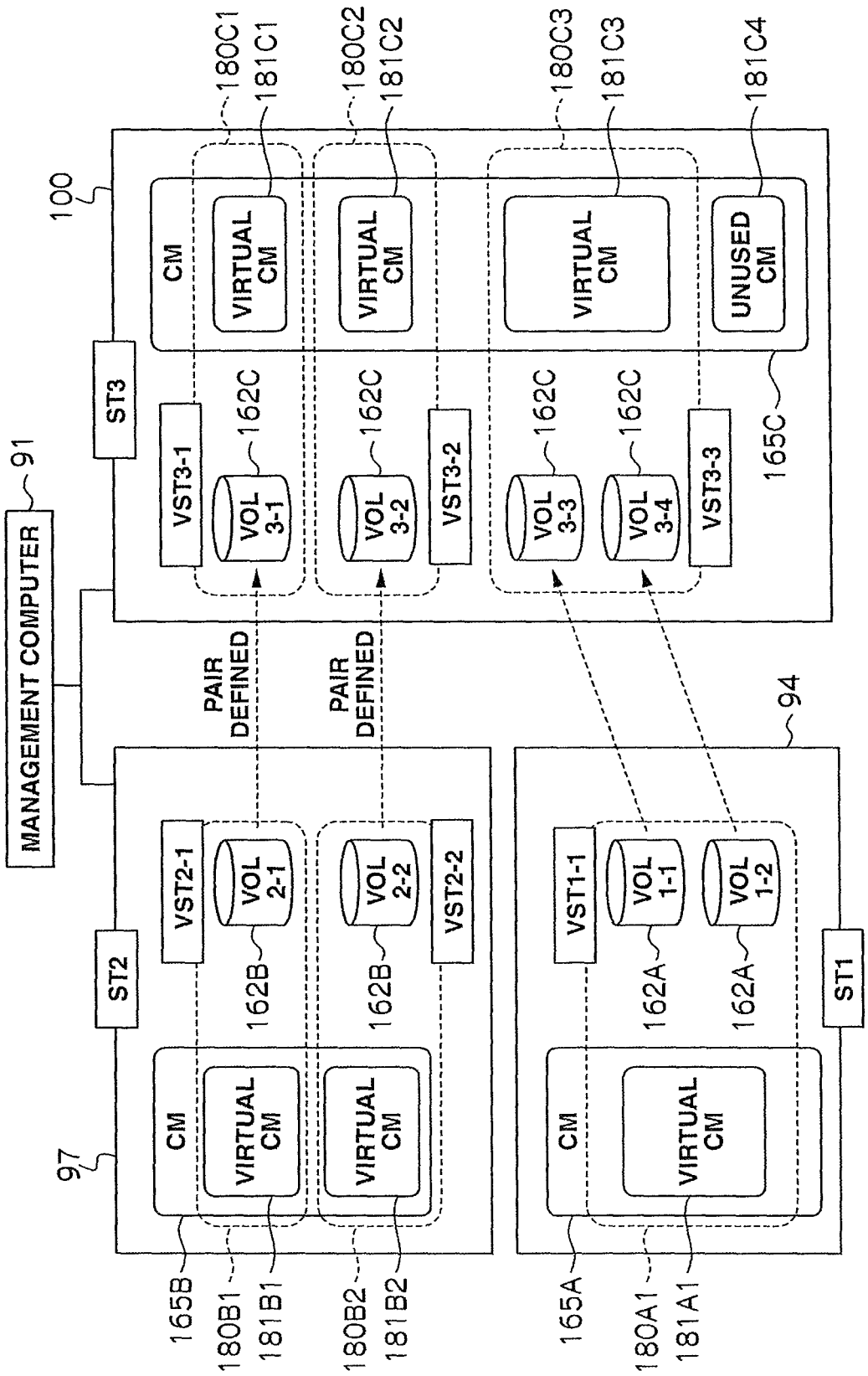
FIG. 30 is a conceptual diagram showing an example of a replication pair configuration according to the second embodiment.

FIG. 30 shows the outline of the status set in each of the foregoing tables. In the example illustrated in FIG. 22 to FIG. 29, the volume 162B of "VOL 2-1" in the second storage apparatus 97 and the volume 162C of "VOL 3-1" in the third storage apparatus 100 are configured as a replication pair, and the volume 162б of "VOL 2-2" in the second storage apparatus 97 and the volume 162C of "VOL 3-2" in the third storage apparatus 100 are configured as a replication pair.

In addition, the virtual storage apparatus environment of the virtual storage apparatus 180B1 of "VST 2-1" to which the volume 162B of "VOL 2-1" in the second storage apparatus 97 is applied as the virtual storage apparatus environment of the virtual storage apparatus 180C1 of "VST 3-1" set in the third storage apparatus 100, and the virtual storage apparatus environment of the virtual storage apparatus 180б2 of "VST 2-2" to which the volume 162б of "VOL 2-2" in the second storage apparatus 97 is applies as the virtual storage apparatus environment of the virtual storage apparatus 180C2 of "VST 3-2" set in the third storage apparatus 100. The status of the virtual cache 181C1 of "VCM 3-1" and the status of the virtual cache 181C2 of "VCM 3-2" in the third storage apparatus 100 are both "passive" (that is, the volume 162C of "VOL 3-1" and the volume 162C of "VOL 3-2" are both secondary volumes in the replication pair).

(2-2) Flow of Replication Pair Configuration Processing in Present Embodiment The flow of the replication pair configuration processing in the storage system 90 is now explained. In the ensuing explanation, a case is explained where the first and second storage apparatuses 94, 97 are the primary storage apparatuses, the third storage apparatus 100 is the secondary storage apparatus, and, as shown in FIG. 30, the volume 162A of "VOL 1-1" used in the same business operation in the first storage apparatus 94 is set as a replication pair with the volume 162C of "VOL 3-3" in the third storage apparatus 100. This is merely an example, and the present invention can also be applied to a replication pair configuration of a single volume or three or more volumes.

In order to differentiate the constituent components of the first to third storage apparatuses 94, 97, 100, as needed, suffix "A" is added to the corresponding reference numeral of the constituent components of the first storage apparatus 94, suffix "B" is added to the corresponding reference numeral of the constituent components of the second storage apparatus 97, and suffix "C" is added to the corresponding reference numeral of the constituent components of the third storage apparatus 100. For example, the volume 162 in the first storage apparatus 94 is indicated as "volume 162A," the volume 165 in the second storage apparatus 97 is indicated as "volume 165B," and the volume 165 in the third storage apparatus 100 is indicated as volume 165.

Here, the user boots the management program 121 (FIG. 19) of the management computer 91, and causes the management computer to display a prescribed replication pair configuration screen. Then, the user uses the replication pair configuration screen to define the volumes 162A of "VOL 1-1" and "VOL 1-2" in the first storage apparatus 94 as the replication source, and defines the volumes 162C of "VOL 3-3" and "VOL 3-4" in the third storage apparatus 100 as the replication destination. The user additionally sets the same replication group ID to these two replication pairs.

Figure 31:
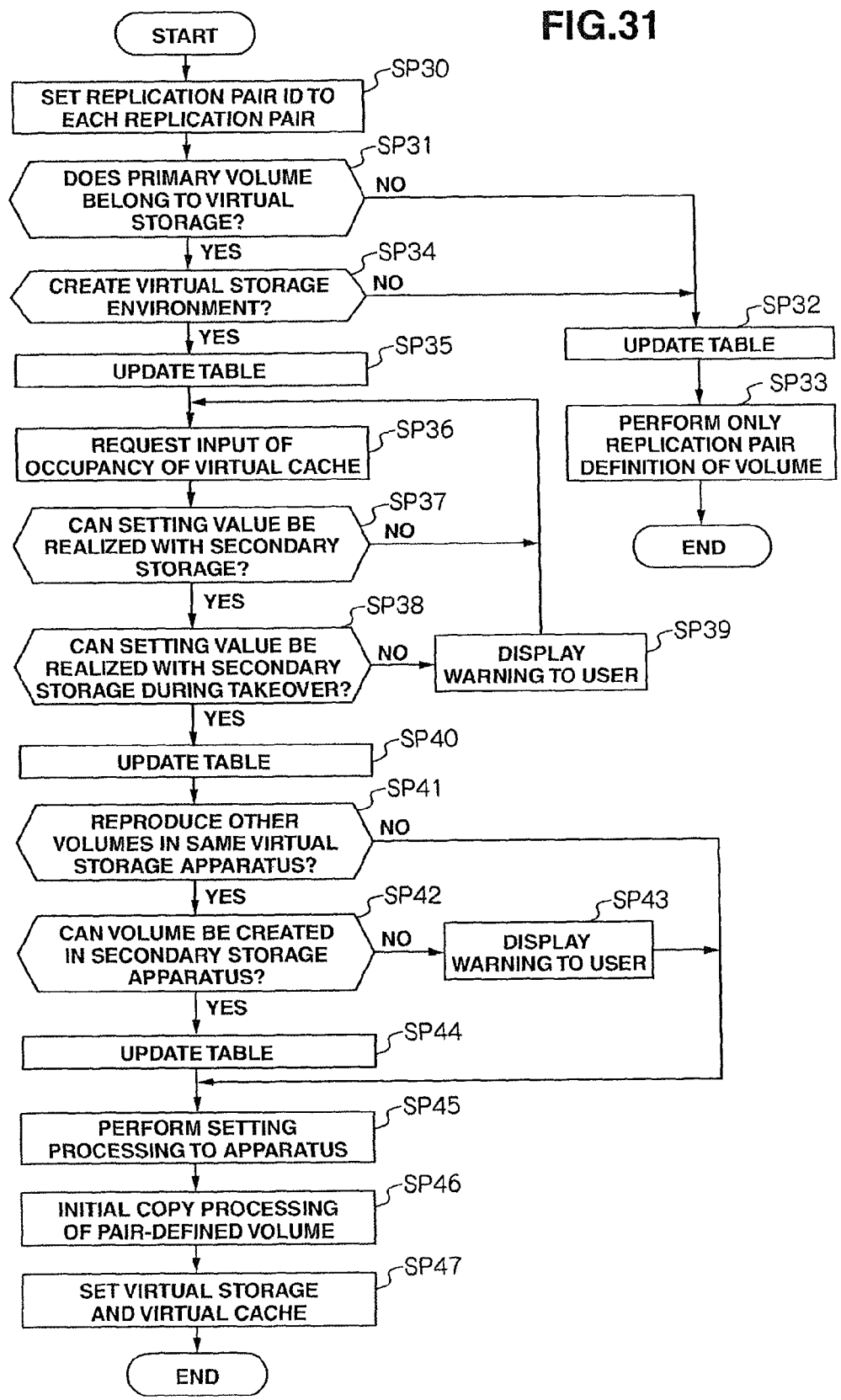
FIG. 31 is a flowchart showing the processing routine of the replication pair configuration processing according to the second embodiment.

When the management program 121 (FIG. 19) of the management computer 91 is given the setting input by the user as described above, based on the replication pair configuration processing routine shown in FIG. 31, it foremost sets a unique replication pair ID to each of the defined replication pairs, and registers the set replication pair ID in the replication pair information table 133 (FIG. 25) (SP30).

Subsequently, the management program 121 refers to the virtual storage apparatus management table 134, and confirms to which one of the virtual storage apparatuses the volume 162A of "VOL 1-1" in the first storage apparatus 94, which is a primary volume of the replication pair set by the user, belongs.

If the volume 162A does not belong to any one of the virtual storage apparatuses set in the first storage apparatus 94 as the primary storage apparatus (SP31; NO), the management program 121 registers the replication pair ID of that replication pair in the virtual environment usage management table 137 (FIG. 29), and sets the virtual storage usage flag of that replication pair in the virtual environment usage management table 137 to "0" (SP32). The management program 121 commands the first storage apparatus 94 as the primary storage apparatus and the third storage apparatus 100 as the secondary storage apparatus to configure the replication pair designated by the user using the replication pair configuration screen (SP33), and thereafter ends this replication pair configuration processing.

Meanwhile, if the primary volume belongs to any one of the virtual storage apparatuses set in the first storage apparatus 94 (SP31; YES), the management program 121 makes an inquiry to the user on whether to create the virtual storage apparatus environment of the virtual storage apparatus to which the primary volume belongs in the third storage apparatus 100 (SP34).

In the example illustrated in FIG. 30, since the volume 162A of "VOL 1-1" in the first storage apparatus 94 belongs to the virtual storage apparatus 180A1 of "VST 1-1," the management program 121 makes an inquiry to the user on whether to use the virtual storage apparatus environment of the virtual storage apparatus 180A1 in the secondary storage apparatus (third storage apparatus 100). As the method of making an inquiry to the user, the inquiry window 70 explained with reference to FIG. 12 in the first embodiment can be used. When making this inquiry, the user may also be provided with a display of information of the virtual cache 181A1 in the virtual storage apparatus 180A1 and the unused capacity of the cache memory 165C in the third storage apparatus 100 as the secondary storage apparatus.

If the management program 121 is given an input of "Do not use the virtual storage apparatus environment of the virtual storage apparatus 180A1 in the secondary storage apparatus" in response to the inquiry (SP34; NO), it performs the processing at step SP32 and step SP33 as described above, and then ends this replication pair configuration processing.

Meanwhile, if the management program 121 is given an input of "Use the virtual storage apparatus environment of the virtual storage apparatus 180A1 in the secondary storage apparatus" in response to the inquiry (SP34; YES), it registers the replication pair ID of that replication pair in the virtual environment usage management table 137 (FIG. 29), and sets the virtual storage usage flag of that replication pair in the virtual environment usage management table 137 to "1." The management program 121 additionally creates a new virtual storage apparatus 180C3 to which the secondary volume of that replication pair in the secondary storage apparatus belongs and registers it in the virtual storage apparatus management table 134 (FIG. 26) according to the contents defined by the user in the replication pair configuration screen, and creates a new virtual cache 181C3 corresponding to that secondary volume and registers it in the virtual cache management table 135 (FIG. 27) (SP35).

For example, when a command is given for creating a replication pair (CPR3) in which the volume 162A of "VOL 1-1" in FIG. 30 is set as the primary volume and the volume 162C of "VOL 3-3" in FIG. 30 is set as the secondary volume, the management program 121 acquires information concerning the virtual storage apparatus 180A1 of "VST 1-1" to which the volume 162A of "VOL 1-1" as the primary volume belongs and the virtual cache 181A1 of "VCM 1-1" used by the primary volume from the virtual storage apparatus management table 134 and the virtual cache management table 135.

The management program 121 creates a new virtual storage apparatus 180C3 to which the volume 162C of "VOL 3-1" as the secondary volume belongs as needed, assigns a virtual storage ID ("VST 3-3" in FIG. 30) to that virtual storage apparatus 180C3, creates a new virtual cache 181C3 to be associated with that secondary volume as needed, and assigns a virtual cache ID ("VCM 3-3" in FIG. 30) to that virtual cache 181C3.

The management program 121 respectively sets the virtual storage apparatus ID and the virtual cache ID to be the new IDs, sets the storage apparatus ID to be the storage apparatus ID of the third storage apparatus 100, sets the administrator ID to be the same administrator ID as the administrator of the primary volume, sets the volume ID of the secondary volume to be the volume ID ("VOL 3-3") of that secondary volume, and registers such information in the virtual storage apparatus management table 134 (FIG. 26). The management program 121 sets the virtual cache ID to be the new ID, sets the storage apparatus ID to be the storage ID of the third storage apparatus 100, sets the cache memory occupancy to be the same capacity as the virtual cache 181A1 associated with the primary volume, sets the volume ID to be the volume ID of the secondary volume, sets the status to "passive," and registers such information in the virtual cache management table 135 (FIG. 27).

Subsequently, the management program 121 requests the user to input the occupancy during a normal condition ("passive") and during a takeover ("active") regarding the virtual cache 181C3 to be associated with the secondary volume (SP36).

In the foregoing case, as a previous step, an inquiry may be made to the user on whether to change the occupancy of the virtual cache 181C3 during a normal condition and during a takeover using a checkbox or the like. If the option of "Do not change" is selected, for example, the occupancy during the takeover of the virtual cache 181A1 associated with the primary volume can be acquired from the resource allocation management table 136 (FIG. 28), and used as is as the occupancy during the takeover of the virtual cache 181C3 associated with the secondary volume.

In the example illustrated in FIG. 28, for instance, if the user selects "Do not change" the occupancy during a normal condition and during a takeover regarding the virtual cache 181C3 associated with the volume 162C of "VOL 3-3" to become the secondary volume of the volume 162A of "VOL 1-1," the management program 121 acquires the occupancy during the takeover of the virtual cache 181A1 associated with the primary volume ("VOL 1-1") from the resource allocation management table 136, and sets this as the occupancy of the virtual cache 181C3.

At step SP36, if the occupancy of the virtual cache 181C3 during a normal condition designated by the user is greater than the occupancy during a takeover, it is also possible to warn the user with a dialog or the like, or request the user to re-input the occupancy. It is also possible to limit the input value on the replication pair configuration screen so that the occupancy of the virtual cache 183C3 during a normal condition will be smaller than the occupancy during a takeover.

Subsequently, the management program 121 determines whether the total capacity of all virtual caches 181C1 to 181C3 in the secondary storage apparatus (third storage apparatus 100) added with the occupancy of the virtual cache 181C3 during a normal condition input at step SP36 exceeds the total capacity of the cache memory 165 of the secondary storage apparatus based on the total capacity of the cache memory 165 of the secondary storage apparatus registered in the storage resource table 131 (FIG. 23), and the occupancy of the existing virtual caches 181C1, 181C2, 181C3 in the secondary storage apparatus registered in the virtual cache table 135 (FIG. 27) (SP37).

For instance, in the example illustrated in FIG. 30, upon referring to the storage resource table 131, the total capacity of the cache memory 162C in the third storage apparatus 100 to which the volume 162C of "VOL 3-3" as the secondary volume belongs is "128 GB" and, upon referring to the virtual cache management table 135, the occupancy of the existing virtual caches 181C1, 181C2 ("VCM 3-1" and "VCM 3-2") in the third storage apparatus 100 is 45 GB (="15 GB"+"30 GB"). Thus, the management program 121 determines the setting value to be impossible if the occupancy during a normal condition input by the user regarding the virtual cache 181C3 associated with the secondary volume is greater than 83 GB (="128 GB"-"45 GB").

If the management program 121 determines that the setting value is impossible at step SP37 (SP37; NO), it displays a warning dialog to warn the user, and thereafter returns to step SP36.

Meanwhile, if the management program 121 determines that the setting value is possible at step SP37 (SP37; YES), it determines whether the total capacity of all virtual caches 181C1 to 181C3 in the secondary storage apparatus (third storage apparatus 100) added with the capacity of the virtual cache 183C3 during a takeover input at step SP36 exceeds the total capacity of the cache memory 165 of the secondary storage apparatus based on the same method as step SP37 (SP38).

If the management program 121 determines that the setting value is impossible during the takeover by the second storage apparatus at step SP38 (SP38; NO), it warns the user that the capacity of the corresponding virtual cache 181C3 cannot be changed to the designated capacity during a takeover when the secondary volume takes over, and thereafter returns to step SP36.

As examples where the setting value is determined to be impossible during the takeover by the secondary storage apparatus, for instance, there is a case where the setting value will exceed the total capacity of the cache memory 165 in the secondary storage apparatus if the currently-set occupancy of the virtual caches 181C1, 181C2 is changed to the capacity during a takeover, or a case where the setting value will exceed the total capacity of the cache memory 165 of the second storage apparatus when, in addition to the target virtual cache 181C3, the other existing virtual caches 181C1, 181C2 in the secondary storage apparatus are simultaneously changed to the capacity during a takeover. In the latter case, that combination may also be displayed together with a warning.

Meanwhile, if the management program 121 determines at step SP38 that the setting value is possible during the takeover by the secondary storage apparatus (third storage apparatus 100) (SP38; YES), it registers the occupancy of the virtual cache 181C3 during the normal condition and during the takeover input at step SP36 in the resource allocation management table 136 (FIG. 28) (SP40).

Subsequently, the management program 121 makes an inquiry to the user on whether to also create a secondary volume in the secondary storage apparatus and create a replication pair regarding the volumes 162A other than those configured as a replication pair in the virtual storage apparatus 180A1 to which "VOL 1-1" as the primary volume belongs (SP41). For instance, in the example illustrated in FIG. 30, the volume 162A of "VOL 1-2" corresponds to the volume 162A other than those configured as a replication pair in the virtual storage apparatus 180A1 to which the "VOL 1-1" belongs.

As the method of making an inquiry to the user in this case, for example, a method of displaying a message to such effect and a dialog including an OK button and a NO button may be adopted. Here, in addition to the foregoing message, the dialog may also display information regarding the capacity and the like of the target volume 162A (volume 162A other than those configured as a replication pair in the virtual storage apparatus 180A1 to which the primary volume belongs).

If the management program 121 is given an input to the effect of not creating the replication pair at step SP41 (SP41; NO), it proceeds to step SP45. Meanwhile, if the management program 121 is given an input to the effect of creating the replication pair (SP41; YES), it confirms whether it is possible to create a volume 162C in the third storage apparatus 100 as the secondary storage apparatus (SP42). Specifically, the management program 121 refers to the virtual storage apparatus management table 134 (FIG. 26) and the volume information management table 132 (FIG. 24), calculates the summation of the volume capacity that needs to be created in the virtual storage apparatus 180C3 of the secondary storage apparatus, and determines whether this can be realized in the secondary storage apparatus.

If the management program 121 obtains a positive result in this determination (SP42; YES), it additionally registers the volume information of the volume (volume of "VOL 3-2" in the example of FIG. 30) 162C to be newly created on the secondary storage apparatus side in the volume information management table 132, and registers the replication pair with the volume 162C as the secondary volume in the replication pair information table 133 (FIG. 25). The management program 121 additionally registers the volume ID of the volume 162C as the volume 162C belonging to the virtual storage apparatus 180C3 newly created at step SP35 in the virtual storage apparatus management table 134 (FIG. 26), and associates this volume ID with the virtual cache 181C3 to which the occupancy was set at step SP40, and further registers this in the virtual cache management table 135 (SP44).

Meanwhile, if the management program 121 obtains a negative result in the determination at step SP42 (SP42; NO), it uses a dialog to warn the user that the volume 162A belonging to the same virtual storage apparatus 180A as the primary volume cannot be replicated to the secondary storage apparatus (SP43). The management program 121 thereafter proceeds to step SP45 since this volume 162A will not be replicated.

Subsequently, the management program 121 commands the secondary storage apparatus to set the virtual storage apparatus 180C3 and to set the virtual cache 181C3, and, upon obtaining a positive result at step SP42, commands the secondary storage apparatus to create a corresponding volume 162C (SP45).

The management program 121 thereafter refers to the replication pair information table 133, and commands the primary storage apparatus and the secondary storage apparatus to initially copy the data of each primary volume configured as a replication pair to the corresponding secondary volume (SP46).

The management program 121 thereafter commands the secondary storage apparatus to set the occupancy of the virtual cache 181C3 set in the secondary storage apparatus to the occupancy during a normal condition registered in the resource allocation management table 136 (FIG. 28) (SP47), and then ends this replication pair configuration processing.

In the replication pair configuration processing, the processing at step SP34 onward may also designate a replication pair at an arbitrary time after the completion of the replication pair configuration and not while the user is defining the replication pair so as to configure the virtual storage apparatus environment of the primary volume in the secondary storage apparatus.

In the foregoing replication pair configuration processing, although a case was explained where the virtual cache 181A1 and the volume 162A provided in the virtual storage apparatus 180A are created in the secondary storage apparatus in virtual storage apparatus units, this may also be created in virtual cache units or replication group units.

For example, in the case of virtual cache units, the virtual cache and the volume 162A using that virtual cache will be the targets. With the setting method in replication group units, the volumes 162A used in the same business operation are assembled into a single group (hereinafter referred to as the "business group"), and, when the user defines one volume 162A in the business group as a replication pair using the management program 121, the virtual cache used by the business group and the volume in the business group will be the targets.

The processing to be performed by the management program 121 of the management computer 91 in a case where a failure occurs in the volume 162A of the primary storage apparatus is now explained with reference to FIG. 32.

If the failure detection program 172 detects a failure in any one of the volumes 162 subject to remote replication in the primary storage apparatus, such failure is notified to the management computer 91. This failure may be a failure of the volume 162 itself, or a failure of the storage apparatus itself affected by an earthquake.

When the management program 121 of the management computer 91 receives this notice, it starts the takeover processing shown in FIG. 32, foremost refers to the replication pair information table 133 (FIG. 25), and acquires the replication pair ID of the replication pair configured from a failed volume (hereinafter referred to as the "failed volume" as needed) 162 and the volume information of the secondary volume (SP50). For example, in the example illustrated in FIG. 30, if a failure occurs in the volume 162B of "VOL 2-1" in the second storage apparatus 97, the management program 121 refers to the replication pair information table 133, and acquires the replication pair ID ("CPR1") of the replication pair configured from the volume 162B and the volume ID ("VOL 3-1") of the volume 162C in the third storage apparatus 100 as the secondary volume of the replication pair.

Subsequently, the management program 121 refers to the virtual environment usage management table 137 (FIG. 29) and checks whether the same virtual storage apparatus environment as the failed volume, concerning the secondary volume of the failed volume has been created in the secondary storage apparatus based on the replication pair ID of the replication pair configured from the failed volume acquired at step SP50 (SP51). For example, if the failed volume is the volume 162B of "VOL 2-1," the management program 121 refers to the virtual environment usage management table 137 and checks whether the corresponding virtual storage usage flag is "1" with "CPR1" as the replication pair ID of the replication pair configured from the failed volume acquired at step SP50 as the key.

If the management program 121 obtains a negative result at step SP51 (SP51, NO), it proceeds to step SP53. Meanwhile, if the management program 121 obtains a positive result at step SP51 (SP51, YES), it changes the occupancy of the corresponding virtual cache (SP52).

Specifically, the management program 121 refers to the replication pair information table 133 (FIG. 25) and the virtual storage apparatus management table 134 (FIG. 26), and acquires the virtual storage apparatus ID of the virtual storage apparatus to which the secondary volume belongs and the virtual cache ID of the virtual cache associated with that secondary volume.

The management program 121 acquires the cache memory occupancy during the takeover of the virtual cache from the resource allocation management table 136 (FIG. 28) with the acquired virtual storage apparatus ID and the virtual cache ID as the search key. The management program 121 commands the secondary storage apparatus to change the cache memory occupancy of the corresponding virtual cache to the acquired cache memory occupancy. Consequently, upon receiving the foregoing command, the secondary storage apparatus changes the cache occupancy of the corresponding virtual cache to the designated occupancy. The management program 121 changes the content of the status column corresponding to the virtual cache in the virtual cache management table 135 (FIG. 27) from "passive" to "active."

Subsequently, the management program 121 performs the failover processing of the first and/or second application server 93, 96 using the failed volume (SP53). If the failed volume exists in the first storage apparatus 94, and a failure occurs in the first application server 93 simultaneously with the first storage apparatus 94 due to a disaster such as an earthquake, failover processing is also performed to the standby application server 99. Thus, the failover program 150 of the standby application server 99 is constantly monitoring the first application server 93 and, upon detecting a failure in the first application server 93, performs the business transfer processing to the standby application server 99.

Subsequently, the management program 121 notifies the takeover program 120 (FIG. 19) that a failure occurred in the volume 162. The takeover program 120 that received this notice refers to the takeover management table 130 (FIG. 22), and acquires information concerning the primary volume and the secondary volume, and the first and/or second application server 93, 96 using the primary volume.

If a failure occurs in the primary volume, the management program 121 acquires the application server ID of the application server to command the takeover from the replication pair ID of the replication pair configured from the failed volume, and commands the first and/or second application server 93, 96 to perform the takeover by the secondary volume (SP54). The management program 121 thereafter ends this takeover processing.

(2-3) Effect of Present Embodiment As one effect of the present embodiment, the consolidation of data stored in a plurality of primary storage apparatuses into a single secondary storage apparatus is explained below.

As shown in FIG. 30, in a case where the volumes 162A of "VOL 1-1" and "VOL 1-2" in the first storage apparatus 94 are respectively configured as a replication pair with the volumes 162C of "VOL 3-3" and "VOL 3-4" in the third storage apparatus 100, and the volumes 162B of "VOL 2-1" and "VOL 2-2" in the second storage apparatus 97 are respectively configured as a replication pair with the volumes 162C of "VOL 3-1" and "VOL 3-2" in the third storage apparatus 100, the cache occupancy of the first to third virtual cache memories 181C1 to 181C3 set in the third storage apparatus 100 if a failure occurs in the volume 162B of "VOL 2-1," if a failure occurs in the respective volumes 162B of "VOL 2-1" and "VOL 2-2," and if a failure occurs in the respective volumes 162A, 162B of "VOL 1-1," "VOL 2-1" and "VOL 2-2" is shown in FIG. 33.

In the case of the foregoing example, whether during a normal condition (second row from the bottom in FIG. 33) or when a failure occurs in the respective volumes 162B of "VOL 2-1" and "VOL 2-2" due to a chassis failure of the second storage apparatus 97 (third row from the bottom in FIG. 33), as shown in storage resource table 131 (FIG. 23), the total capacity of the cache memory 165C of the third storage apparatus 100 is "128 GB," which means that the business operation can be performed. Particularly, in cases where the first and second storage apparatuses 94, 97 exist at different sites as explained with reference to FIG. 18, even if a chassis failure occurs in the second storage apparatus 97 due to an earthquake disaster, the remote replication of the first storage apparatus 94 and the takeover of the second storage apparatus 97 can be realized simultaneously.

As another effect of the present embodiment, even if the performance of the primary storage apparatus and the performance of the secondary storage apparatus are different, it is still possible to perform the foregoing replication pair configuration processing and takeover processing.

(3) Third Embodiment

With the storage system 90 according to the second embodiment, if the capacity of a virtual cache associated with a certain secondary volume is insufficient in comparison to the requisite capacity, the access speed to that secondary volume will be slow. Thus, with the storage system 90, it is desirable to allocate a greater cache memory occupancy in virtual caches that are associated with a secondary volume to be used in high-priority business operations.

Nevertheless, with the storage system 90 according to the second embodiment, since the occupancy of each virtual cache to the cache memory in the secondary storage apparatus is set arbitrarily by the user, the greater the number of virtual caches to be set in the secondary storage apparatus, the more cumbersome the processing of allocating the cache memory occupancy described above.

Figure 34:
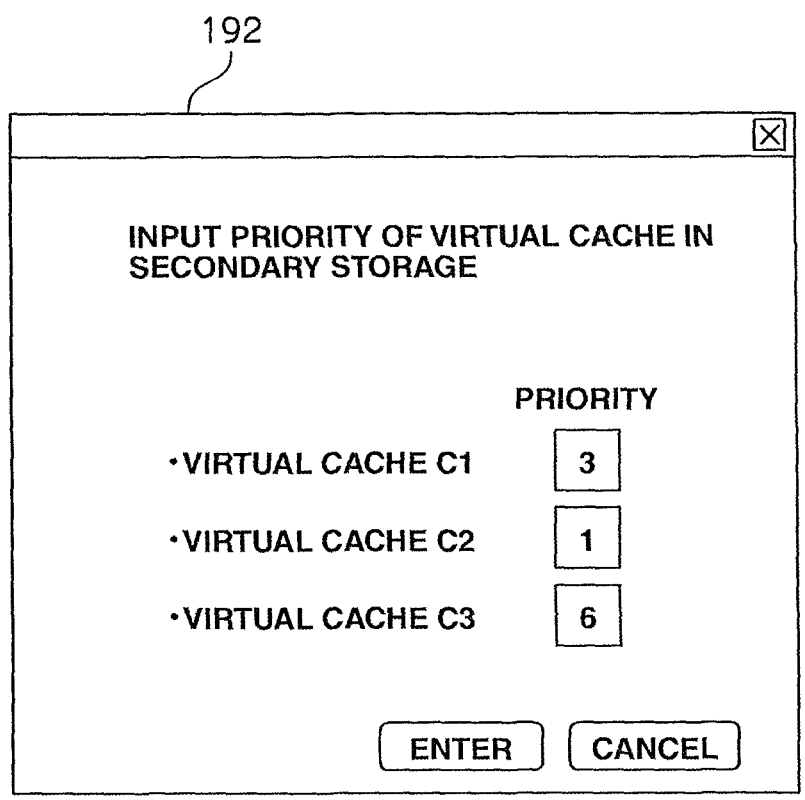
FIG. 34 is a schematic diagram showing the configuration of a priority setting window.

Thus, the storage system 90 (FIG. 18) according to the present embodiment is characterized in that a priority (priority order) can be set for each virtual cache. In reality, with this storage system 90, the user is able to operate the management computer 91 (FIG. 18) and cause the management computer 91 to display a priority setting window 192 as shown in FIG. 34. Then the user is able to use this priority setting window 92 to set the priority of the virtual cache in the secondary storage apparatus.

The management computer 91 retains a resource allocation management table 193 according to this embodiment as shown in FIG. 35 in the memory 111 (FIG. 19) in substitute for the resource allocation management table 136 explained with reference to FIG. 28, and manages the priority of each virtual cache of the secondary storage apparatus designated using the priority setting window 192 by storing it in the "priority" column 193C of the resource allocation management table 193. The cache priority is not designated regarding the virtual cache use by the primary volume. The "virtual cache ID" column 193A and the "storage apparatus ID" column 193B of the resource allocation management table 193 respectively store the same information as the information to be stored in the virtual cache ID" column 136A and the "storage apparatus ID" column 136B of the resource allocation management table 136 explained with reference to FIG. 28.

Figure 36:
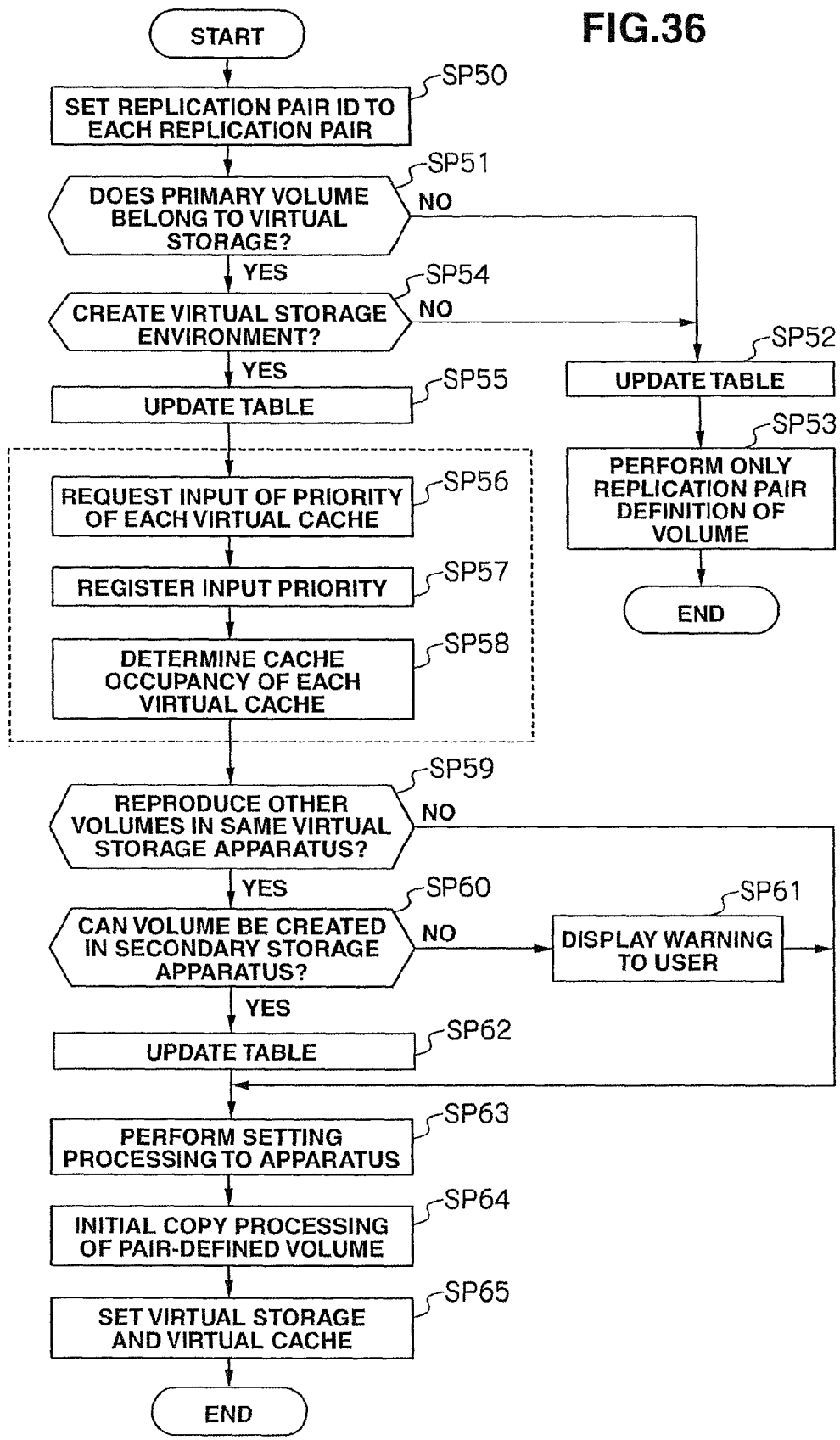
FIG. 36 is a flowchart showing the processing routine of the replication pair configuration processing according to the third embodiment.

FIG. 36 shows the processing contents of the management program 121 (FIG. 19) of the management computer 91 concerning the replication pair configuration processing according to this embodiment including the setting of the virtual cache priority as described above. This replication pair configuration processing only differs in the section encircled with the dotted line in FIG. 36, and the remaining processing is the same as the replication pair configuration processing according to the second embodiment explained with reference to FIG. 31.

In reality, the management program 121 starts the replication pair configuration processing shown in FIG. 36 when the user uses the foregoing replication pair configuration screen not shown to define the intended replication pair, and performs the processing of step SP50 to step SP55 as with the processing of step SP30 to step SP35 of FIG. 31.

Subsequently, the management program 121 displays the priority setting window 192 explained with reference to FIG. 34 on the management computer 91, and thereby requests the user to input the priority of each virtual cache in the secondary storage apparatus (SP56).

When the priority of each virtual cache in the secondary storage apparatus is input by the user using the priority setting window 192, the management program 121 respectively stores these priorities in the "priority" column 193C of the resource allocation management table 193 explained with reference to FIG. 35 (SP57).

Subsequently, the management program 121 refers to the resource allocation management table 193, acquires the priority of each virtual cache in the secondary storage apparatus, and determines the occupancy of the virtual cache of the secondary storage apparatus 10 according to each of the acquired priorities (SP58).

Here, as a method of determining the occupancy according to the priority of the virtual cache, a method of the management program 121 re-allocating the cache occupancy of each virtual cache in the secondary storage apparatus according to the priority ratio upon newly deciding the virtual cache can be adopted.

For instance, in the example illustrated in FIG. 30, if the total cache memory capacity of the third storage apparatus 100 is "128 GB" as shown in FIG. 23, and the priorities of the first to third virtual cache memories 181C1 to 181C3 in the third storage apparatus 100 are respectively set to 3, 1 and 6 as shown in FIG. 35, the priority ratio of the first to third virtual cache memories 181C1 to 181C3 will be 3:1:6. Thus, the management program 121 uses this ratio to calculate the cache occupancy of the first virtual cache 181C1 to be 38.4 GB, the cache occupancy of the second virtual cache 181C2 to be 12.8 GB, and the cache occupancy of the third virtual cache 181C3 to be 76.8 GB when the first to third virtual cache memories 181C1 to 181C3 are "active." In addition, the cache occupancy when the first to third virtual cache memories 181C1 to 181C3 are "passive" is calculated to be half the cache occupancy of "active," and the first virtual cache 181C1 is calculated as 19.2 GB, the second virtual cache 181C2 is calculated as 6.4 GB, and the third virtual cache 181C3 is calculated as 38.4 GB.

As described above, when setting a new virtual cache in the secondary storage apparatus, in addition to the method of changing the cache occupancy of all virtual caches in the secondary storage apparatus, a method of determining only the newly added virtual cache based on priority can also be adopted.

For instance, in the example illustrated in FIG. 30, let it be assumed that the total cache memory capacity of the third storage apparatus 100 is "128 GB" as shown in FIG. 23, and the capacity occupancies of the first and second virtual cache memories 181C1, 181C2 existing in the third storage apparatus 100 are respectively 30 GB (priority 3) and 10 GB (priority 1). Under these circumstances, the management program 121 calculates the cache occupancy of the "passive" third virtual cache 181C3 to be newly set as follows.

If the priority of the third virtual cache 181C3 is greater than the priority (for instance, "6") of the existing first and second virtual cache memories 181C1, 181C2, 40 GB, which is the sum of the cache occupancies of the existing first and second virtual cache memories 181C1, 181C2, is set as the cache occupancy of the third virtual cache 181C3.

If the priority of the third virtual cache 181C3 is lower than the priority (for instance, "1") of the existing first and second virtual cache memories 181C1, 181C2, GB, which is the cache occupancy of the second virtual cache 181C2 with the smallest cache occupancy among the existing first and second virtual cache memories 181C1, 181C2, is set as the cache occupancy of the third virtual cache 181C3.

In all other cases (for instance, the priority of the third virtual cache 181C3 is between the priorities of the first and second virtual cache memories 181C1, 181C2 (for instance, "2")), 20 GB, which is the average occupancy of the first and second virtual cache memories 181C1, 181C2, is set as the cache occupancy of the third virtual cache 181C3.

If the occupancy of the "passive" third virtual cache 181C3 calculated as described above exceeds the capacity that is not being occupied by the existing first and second virtual cache memories 181C1, 181C2 among the cache memories 165C (FIG. 21) of the third storage apparatus 100 (hereinafter referred to as the "unallocated cache capacity"), the cache occupancy of the third virtual cache 181C3 is made to coincide with the unallocated cache memory capacity.

The management program 121 sets the occupancy of the "active" third virtual cache 181C3 as the sum of the unallocated cache capacity of the third storage apparatus 100 and the cache occupancy during a "passive" status that is currently allocated to the existing first and second virtual cache memories 181C1, 181C2. In other words, if 40 GB is allocated to the third virtual cache 181C3 as the cache occupancy during a "passive" status, since the unallocated area that is not being used by the first to third virtual cache memories 181C1 to 181C3 will be 48 GB according to the following formula [Formula 1] 128−(30+10+40)=48 . . . (1), this is added to the 40 GB occupancy of the "passive" third virtual cache 181C3 for a total of 88 GB.

If a plurality of virtual caches including the third virtual cache 181C3 need to be "active," the management program 121 equally divides the unallocated cache capacity of the cache memory 165C in the third storage apparatus 100 with the number of virtual caches to become "active," and calculates the sum of the equally divided unallocated cache capacity and the cache occupancy of the "passive" third virtual cache 181C3 as the cache occupancy of the "active" third virtual cache 181C3. The first and/or second virtual caches 181C1, 181C2 that need to be "active" other than the third virtual cache 181C3 are also calculated according to the same method.

The management program 121 calculates the cache occupancy of each virtual cache in the secondary storage apparatus as described above, and internally sets the calculated cache occupancy of each virtual cache.

Subsequently, the management program 121 performs the processing of step SP59 to step SP65 as with the processing of step SP41 to step SP47 in FIG. 31, and thereafter end this replication pair configuration processing.

With the storage system 90 according to the present embodiment, since the setting of the cache occupancy of each virtual cache in the secondary storage apparatus is performed based on the priority of each virtual cache designated by the user, a greater cache occupancy can be easily allocated to the virtual cache associated with a secondary volume to be used in high-priority business operations.

(4) Fourth Embodiment

With the storage system 90 according to the second embodiment, when it becomes necessary to perform takeover processing in numerous volumes due to the occurrence of a chassis failure in the primary storage apparatus caused by a disaster, there are cases where it is not possible to set occupancies designating all virtual caches in the secondary storage apparatus.

Thus, the storage system 90 (FIG. 18) according to the present embodiment is characterized in that, as a measure for overcoming the foregoing problem, it sets a priority in the virtual cache as with the third embodiment, and a virtual cache with high priority is preferentially taken over.

As a method of deciding the cache memory during a takeover according to the priority, a resource allocation management table 203 as shown in FIG. 37 in which a priority column 201C (FIG. 37) is added to the resource allocation management table 136 explained with reference to FIG. 28 is used. Here, for the sake of explanation, the cache occupancy of the "passive" third virtual cache 181C3 is set to 50 GB.

The resource allocation management table 203 is configured from a virtual cache ID column 203A, a storage ID column 203B, a priority column 203C, and a cache memory occupancy column 203D, and the virtual cache ID column 203A, the storage ID column 203B and the cache memory occupancy column 203D respectively store the same information as the information to be stored in the virtual cache ID column 136A, the storage ID column 136B and the cache memory occupancy column 136D of the resource allocation management table 136 explained with reference to FIG. 28. The priority column 203C stores the priority of the corresponding virtual cache set by the user.

As the timing for the user to set the priority of each virtual cache in the secondary storage apparatus, it may be at the time the replication pair is defined as explained in the third embodiment, or the user may use the management program 121 (FIG. 19) of the management computer 91 (FIG. 18) and set the priority upon designating the secondary storage apparatus at an arbitrary timing.

Figure 32:
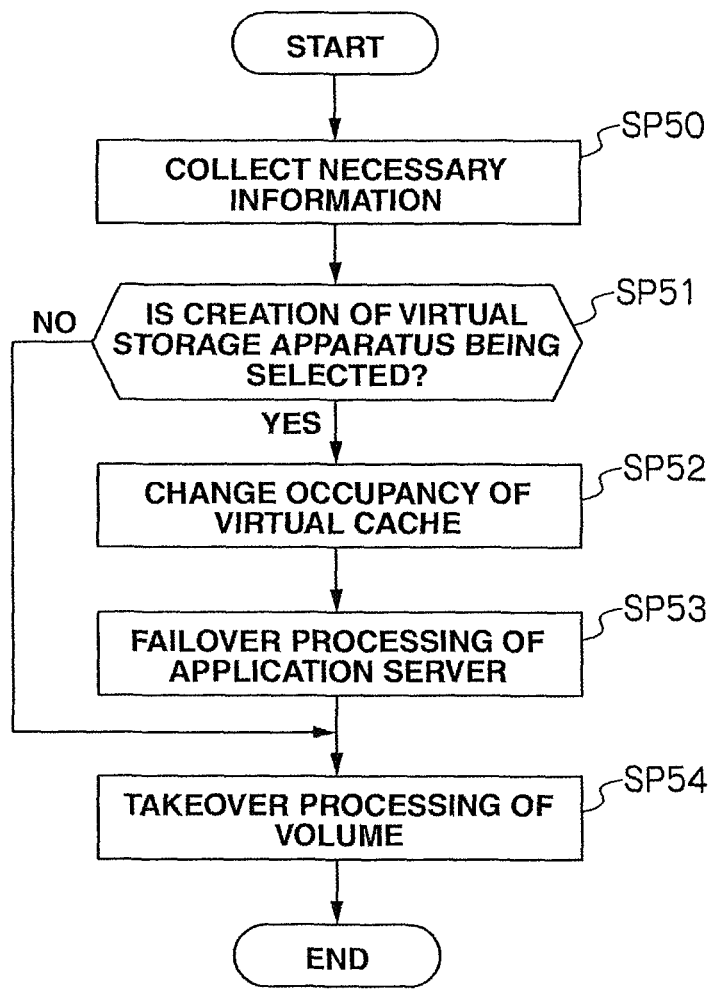
FIG. 32 is a flowchart showing the processing routine of the takeover processing according to the second embodiment.

The processing for determining the priority order of virtual caches when the management program 121 of the management computer 91 uses the resource allocation management table 203 as described above and performs the takeover processing explained with reference to FIG. 32 is now explained. In the ensuing explanation, let it be assumed that, as shown in FIG. 30, the respective volumes 162A of "VOL 1-1" and "VOL 1-2" in the first storage apparatus 94 and the respective volumes 162B of "VOL 2-1" and "VOL 2-2" in the second storage apparatus 97 are configured as a replication pair with the volumes 162C of "VOL 3-3," "VOL 3-4," "VOL 3-1" and "VOL 3-2" in the third storage apparatus 100, and remote replication is performed with these volumes 162C of "VOL 3-3," "VOL 3-4," "VOL 3-1" and "VOL 3-2" in the third storage apparatus 100 as the secondary volumes.

Here, let it be further assumed that, since the first storage apparatus 94 is affected by a disaster and a failure occurred in the overall chassis, it became necessary to change the virtual cache 181C1, 181C2 in the third storage apparatus 100 to the cache occupancy during an "active" status set in the resource allocation management table 203 as a part of the takeover processing. Under these circumstances, the unused cache memory 162A in the first storage apparatus 94 will become insufficient, and it will be impossible to simultaneously change the virtual caches 181C1, 181C2 to the cache occupancy during an "active" status.

Here, the management program 121 of the management computer 91 according to this embodiment refers to the resource allocation management table 203 (FIG. 37) and the storage resource table 131 (FIG. 23), and sets the value during an "active" status in order from the highest priority among the virtual caches 181C1, 181C2 of the third storage apparatus 100.

The processing routine of the management program 121 of the management computer 91 regarding this kind of takeover processing is shown in FIG. 38. This method is one method for changing the cache memory 162 of the secondary storage apparatus to the cache occupancy during an "active" status according to the priority, and there is no particular limitation on the method for making the cache memory 162 "active." In addition, let it be assumed that the priorities of the first to third virtual cache memories 181C1 to 181C3 in the third storage apparatus 100 are respectively set to "1," "3" and "6" as shown in FIG. 37.

In the case of the example shown in FIG. 30, the management program 121 foremost acquires the priority of the virtual caches (hereinafter referred to as the "activation target virtual caches") 181C1, 181C2 that need to be made "active" due to a failure from the resource allocation management table 203 (FIG. 37) (SP70). Thus, in the first round of step SP70, the activation target virtual caches will be the virtual caches 181C1, 181C2.

Subsequently, the management program 121 determines whether an activation target virtual cache exists (SP71), and proceeds to step SP74 when no such activation target virtual cache exists. Meanwhile, if the management program 121 determines that an activation target virtual cache exists, it refers to the storage resource table 131 and the resource allocation management table 202, selects the activation target virtual cache with the highest priority among the activation target virtual caches acquired at step SP70, and determines whether the cache occupancy during an "active" status can be secured regarding this activation target virtual cache (SP72). In the example illustrated in FIG. 30, since the priority of the virtual cache 181C1 is "1" and the priority of the virtual cache C2 is "3," whether it is possible to set the cache occupancy of the "active" virtual cache 181C2 is determined.

If the management program 121 obtains a negative result in this determination, it proceeds to step SP74. Meanwhile, if the management program 121 obtains a positive result in this determination, it commands the second storage apparatus to change the cache occupancy of the virtual cache with the highest priority selected at step SP71 to the value during an "active" status, and then returns to step SP71.

In the example illustrated in FIG. 30, the remaining capacity of the cache memory 165C in the third storage apparatus 100 is 33[GB] as shown in the following formula [Formula 2] 128−(15+30+50)=33 . . . (2), and, since the value of the "active" second virtual cache 181C2 having the highest priority selected at step SP71 is "45 GB," the cache occupancy of the second virtual cache 181C2 can be set to the cache occupancy during an "active" status. Thus, the management program 121 commands the third storage apparatus 100 to change the cache occupancy of the second virtual cache 181C2 to a value during an "active" status, and then returns to step SP71.

If the management program 121 returns to step SP71, it thereafter repeats step SP71 to step SP73 until it obtains a negative result at step SP71 or step SP72. For instance, in the example illustrated in FIG. 30, since the first virtual cache 181C1 exists as the activation target virtual cache having the next highest priority in the second round, the management program 121 obtains a positive result at step SP71, proceeds to step SP72, and, at step SP72, determines whether the cache occupancy of the "active" first virtual cache 181C1 can be secured.

In the foregoing case, the unused area of the cache memory 165C in the current third storage apparatus 100 has been reduced from 33 GB to 18 (=45−30)GB since the second virtual cache 181C2 has been set to "active," and the capacity of 25 (=40−15)GB requires for making the first virtual cache 181C1 "active" is no longer available in the cache memory 165C. Thus, since a negative result will be obtained at step SP72 in this case, the routine proceeds to step SP74 while leaving the first virtual cache 181C1 in a "passive" status.

Thus, in this case, the occupancy of the virtual cache C1 will be 15 GB (passive), the occupancy of the virtual cache C2 will be 45 GB (active), and the occupancy of the virtual cache C3 will be 50 GB (passive).

When the management program 121 proceeds to step SP74, it updates the virtual cache management table 135 (FIG. 27) so that the virtual cache status, in which the secondary storage apparatus was command to change the cache occupancy to a value during an "active" status at step SP73, becomes "active," executes the other takeover processing or failover processing as necessary (SP74), and thereafter ends this takeover processing.

Although the occupancy setting processing is ended if the virtual cache with the highest priority cannot be changed to an "active" value at step SP72 in FIG. 38, in substitute for this method, whether the virtual cache with the next highest priority can be changed to an "active" value may also be checked.

In the foregoing method, only the virtual caches with high priority in the secondary storage apparatus are changed to the occupancy during an "active" status. As another method, the occupancies of the virtual caches to be made "active" may be may be respectively decided according to the priority ratio.

For example, the management program 121 refers to the resource allocation management table 203 and acquires the priority of the activation target virtual cache. The management program 121 acquires the remaining capacity of the virtual cache in the third storage apparatus 100 that is not being used by the third virtual cache 181C3 based on the storage resource table 131 (FIG. 23) and the resource allocation management table 203. The management program 121 divides the remaining capacity with the priority ratio of each activation target virtual cache, and thereby sets the cache occupancy of each activation target virtual cache.

For instance, in the example illustrated in FIG. 30, since the priority of the first virtual cache 181C1 in the third storage apparatus 100 is "1," the priority of the second virtual cache 181C2 is "3," and the remaining capacity in the third storage apparatus 100 is 78 GB, this 78 GB is divided by the priority ratio, and the cache occupancy of the first virtual cache 181C1 (priority 1) is calculated to be 19.5 GB with the following formula [Formula 3] $78 \times 1/4 = 19.5 \ldots (3)$, and the occupancy of the second virtual cache 181C2 (priority 3) is calculated to be 58.5 GB with the following formula [Formula 4] $78 \times 3/4 = 58.5 \ldots (4)$, and such occupancies are thereby set. In addition to the foregoing method, the occupancy of the virtual cache can also be decided according to the priority ratio including virtual caches that are currently in a "passive" status.

The priority of the third embodiment may also be used as the priority for deciding the cache memory occupancy during a takeover as explained in this embodiment.

As described above, with the storage system 90 according to the present embodiment, since the takeover processing from a plurality of primary volumes to the corresponding secondary volume is performed in order according to the priority set to each virtual cache in the secondary storage apparatus, a greater cache occupancy can be easily allocated to the virtual cache associated with a secondary volume to be used in high-priority business operations after the takeover processing.

(5) Other Embodiments

Although the foregoing first to fourth embodiments explained a case of applying the present invention to the storage systems 1, 90 configured as illustrated in FIG. 1 or FIG. 18, the present invention is not limited to the foregoing configuration, and may be broadly applied to various storage systems of other configurations. Although the foregoing first embodiment explained a case where the configuration information sending unit for sending the configuration information of the virtual storage apparatus, to which the primary volume belongs, to the secondary storage apparatus was configured from the CPU 33 and the apparatus management program 40 of the first storage apparatus 5, and the foregoing second to fourth embodiments explained a case where the configuration information sending unit was configured from the CPU 110 and the management program 121 of the management computer 91, the present invention is not limited to the foregoing configurations, and various other configurations may be broadly applied to the configuration of the configuration information sending unit.

In addition, although the foregoing first embodiment explained a case where the logical partition setting unit for configuring the logical partition to which the secondary volume belongs based on the configuration information of the logical partition (virtual storage apparatus) to which the primary volume belongs was configured from the CPU 33 and the apparatus management program 40 of the second storage apparatus 6, and the foregoing second to fourth embodiments explained a case where the logical partition setting unit was configured from the CPU 110 and the management program 121 of the management computer 91, the present invention is not limited to the foregoing configurations, and various other configurations may be broadly applied to the configuration of the logical partition setting unit.

What is claimed is:

1. A storage system including a first storage apparatus and a second storage apparatus capable of partitioning an internal resource into logical partitions and managing the logical partitions, and which replicates data written into a first volume of the first storage apparatus to a second volume of the second storage apparatus, comprising:
   a configuration information sending unit for sending configuration information of the logical partition, to which the first volume belongs, to the second storage apparatus; and
   a logical partition setting unit for setting the configuration of the logical partition to which the second volume belongs based on the configuration information of the logical partition to which the first volume belongs sent from the configuration information sending unit;
   wherein the configuration information of the logical partition includes the capacity of a virtual cache, which is a virtual cache memory allocated to the logical partition to which the first volume belongs; and
   wherein the logical partition setting unit initially sets the capacity of the virtual cache to be allocated to the logical partition to which the second volume belongs to be smaller than the capacity of the virtual cache allocated to the logical partition to which the first volume belongs.

2. The storage system according to claim 1,
   wherein, upon switching the host system access destination from the first volume to the second volume, the logical partition setting unit changes the capacity of the virtual cache to be allocated to the logical partition to which the second volume belongs to the capacity of the virtual cache allocated to the logical partition to which the first volume belongs.

3. The storage system according to claim 1,
   wherein the configuration information sending unit sends the configuration information of the logical partition to which the first volume belongs to the second storage apparatus upon configuring a replication pair of the first volume and the second volume.

4. The storage system according to claim 1,
wherein the configuration information sending unit is provided to the first storage apparatus.

5. The storage system according to claim 1,
wherein the configuration information sending unit is provided to a management apparatus for managing the first storage apparatus and the second storage apparatus.

6. The storage system according to claim 1,
wherein the logical partition setting unit sets a priority to each of the virtual caches allocated respectively to each of the logical partitions in the second storage apparatus, and determines the capacity of each of the virtual caches according to the priority.

7. The storage system according to claim 6,
wherein the logical partition setting unit determines the capacity of each of the virtual caches in the second storage apparatus according to the priority upon switching the host system access destination from the first volume to the second volume.

8. A management method of a storage system including a first storage apparatus and a second storage apparatus and capable of partitioning an internal resource into logical partitions and managing the logical partitions, and which replicates data written into a first volume of the first storage apparatus to a second volume of the second storage apparatus, comprising:
a first step for sending configuration information of the logical partition, to which the first volume belongs, to the second storage apparatus; and
a second step unit for setting the configuration of the logical partition to which the second volume belongs based on the configuration information of the logical partition to which the first volume belongs;
wherein the configuration information of the logical partition includes the capacity of a virtual cache, which is a virtual cache memory allocated to the logical partition to which the first volume belongs; and
wherein, at the second step, the capacity of the virtual cache to be allocated to the logical partition to which the second volume belongs is initially set to be smaller than the capacity of the virtual cache allocated to the logical partition to which the first volume belongs.

9. The storage system management method according to claim 8,
wherein, at the second step, the capacity of the virtual cache to be allocated to the logical partition to which the second volume belongs is changed to the capacity of the virtual cache allocated to the logical partition to which the first volume belongs upon switching the host system access destination from the first volume to the second volume.

10. The storage system management method according to claim 8,
wherein, at the first step, the configuration information of the logical partition to which the first volume belongs is sent to the second storage apparatus upon configuring a replication pair of the first volume and the second volume.

11. A management method of a storage system including a first storage apparatus and a second storage apparatus and capable of partitioning an internal resource into logical partitions and managing the logical partitions, and which replicates data written into a first volume of the first storage apparatus to a second volume of the second storage apparatus, comprising:
a first step for sending configuration information of the logical partition, to which the first volume belongs, to the second storage apparatus; and
a second step unit for setting the configuration of the logical partition to which the second volume belongs based on the configuration information of the logical partition to which the first volume belongs;
wherein, at the second step, a priority is set to each of the virtual caches allocated respectively to each of the logical partitions in the second storage apparatus, and the capacity of each of the virtual caches is determined according to the priority.

12. The storage system management method according to claim 11,
wherein, at the second step, the capacity of each of the virtual caches in the second storage apparatus is determined according to the priority upon switching the host system access destination from the first volume to the second volume.

* * * * *